United States Patent
Yaguchi

(10) Patent No.: US 9,591,170 B2
(45) Date of Patent: Mar. 7, 2017

(54) IMAGE PROCESSING APPARATUS, AND CONTROL METHOD AND PROGRAM OF IMAGE PROCESSING APPARATUS

(71) Applicant: CANON KABUSHIKI KAISHA, Tokyo (JP)

(72) Inventor: Hiroyuki Yaguchi, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/883,951

(22) Filed: Oct. 15, 2015

(65) Prior Publication Data
US 2016/0127598 A1   May 5, 2016

(30) Foreign Application Priority Data

Oct. 31, 2014 (JP) ................................. 2014-223254

(51) Int. Cl.
*H04N 1/21* (2006.01)
(52) U.S. Cl.
CPC .................................. *H04N 1/2112* (2013.01)
(58) Field of Classification Search
CPC .. H04N 1/2112; H04N 1/2129; H04N 1/2133; H04N 1/2137; H04N 1/2141; H04N 1/2145; H04N 1/2166; G06F 12/00; G06F 12/02; G06F 3/153; G06F 3/06; G09G 5/00; G11C 11/401; G11C 11/407; G08B 13/19669; G08B 13/19676
See application file for complete search history.

(56) References Cited

U.S. PATENT DOCUMENTS

| | | | | |
|---|---|---|---|---|
| 8,237,816 B2 * | 8/2012 | Fishman | ............... | H04N 1/2137 348/222.1 |
| 2012/0098987 A1 * | 4/2012 | Tsuda | ................... | H04N 1/2141 348/222.1 |
| 2014/0009478 A1 * | 1/2014 | Suzuki | ...................... | G06T 1/60 345/531 |
| 2015/0163370 A1 * | 6/2015 | Suzuki | ................. | H04N 1/2129 348/231.99 |
| 2015/0181118 A1 * | 6/2015 | Suzuki | ............... | H04N 5/23241 348/231.99 |
| 2015/0213574 A1 * | 7/2015 | Chida | ..................... | G06F 12/00 345/531 |

FOREIGN PATENT DOCUMENTS

JP       3688977 B        8/2005

* cited by examiner

*Primary Examiner* — Aung S Moe
(74) *Attorney, Agent, or Firm* — Fitzpatrick, Cella, Harper & Scinto

(57) ABSTRACT

An image processing apparatus generates second image data having different numbers of pixels from image data having first resolution for each frame, outputs first and second image data in a first order, subjects the first and second image data to a predetermined process in a second order which is different from the first order, and controls the writing of the output image data in a memory and the readout of the processed image data from the memory by the unit of the frame, according to the first and second order. The read address in the first frame and the write address of the second frame which is subsequent to the first frame are an address of a first storage region of the memory, and the write address in the second frame is determined to be the read address according to which the first frame has been read out.

11 Claims, 14 Drawing Sheets

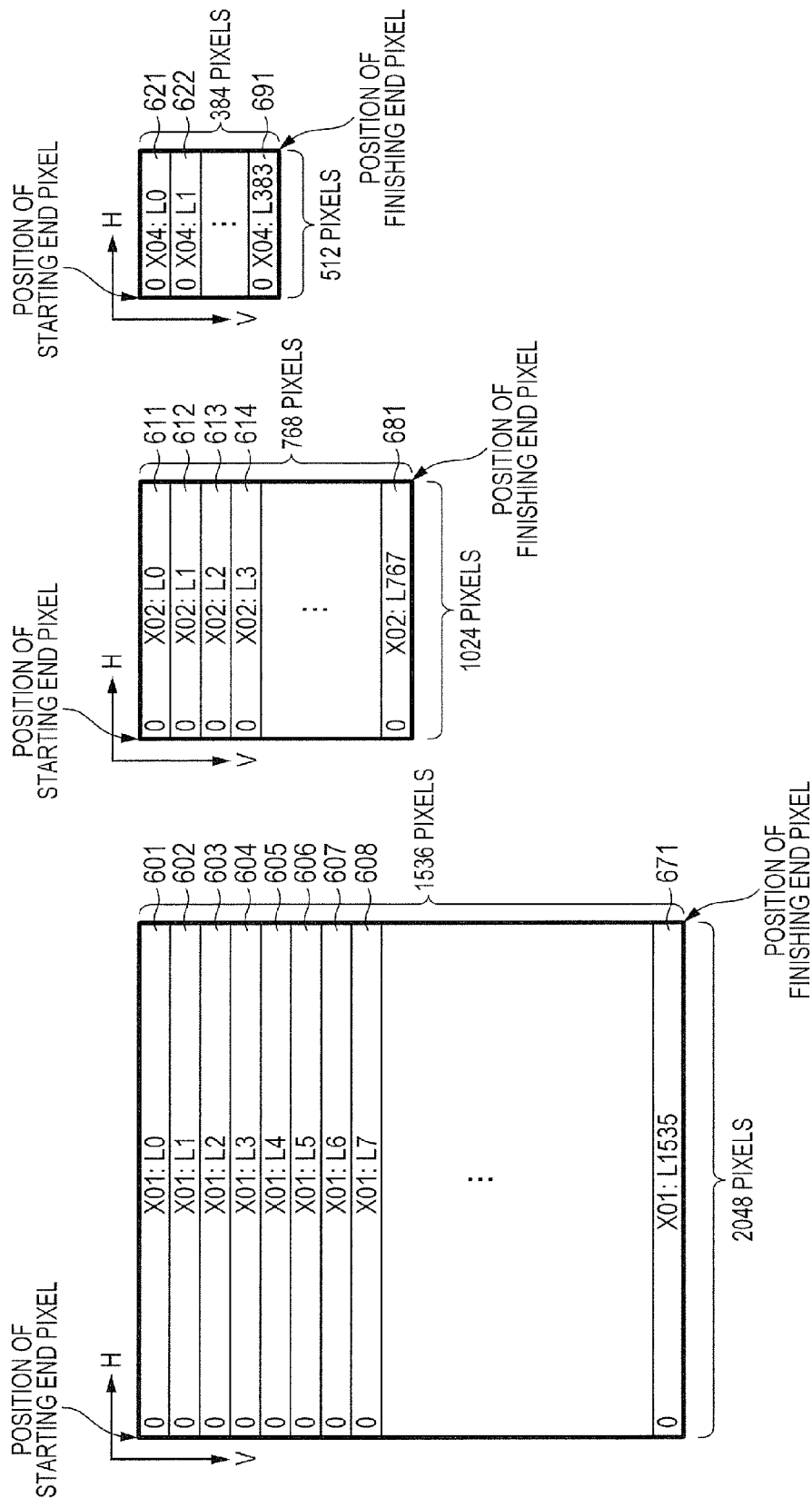

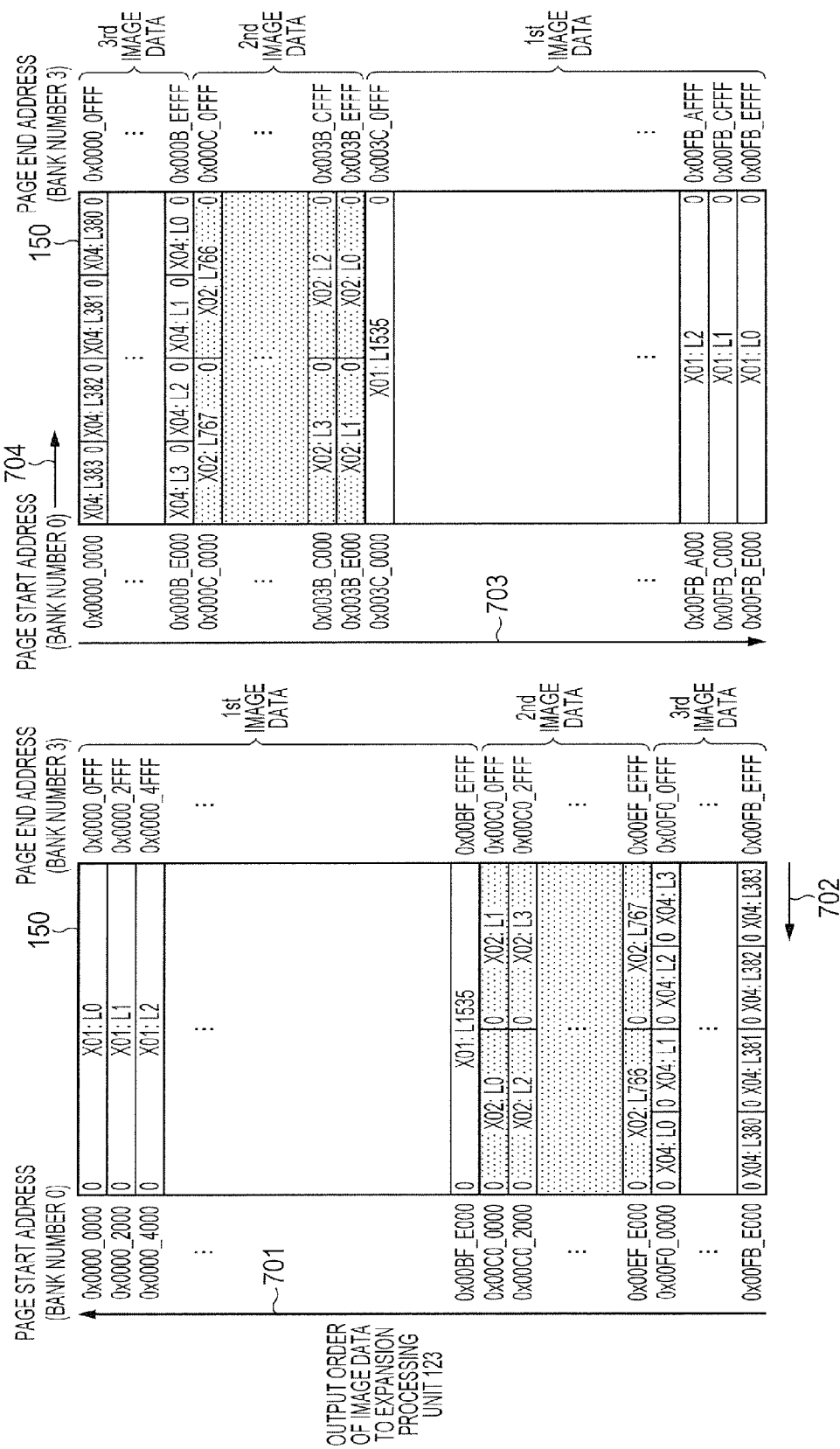

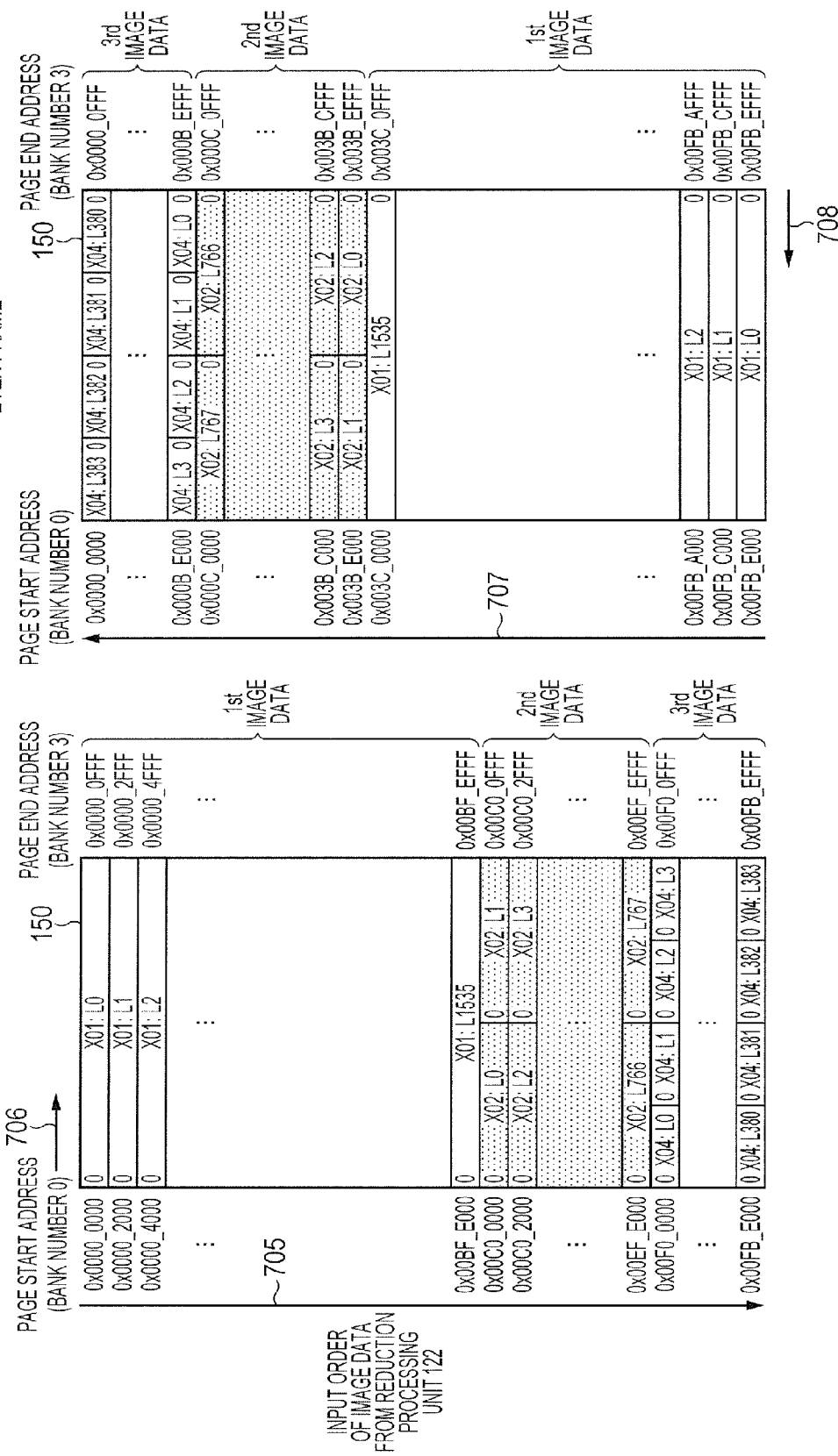

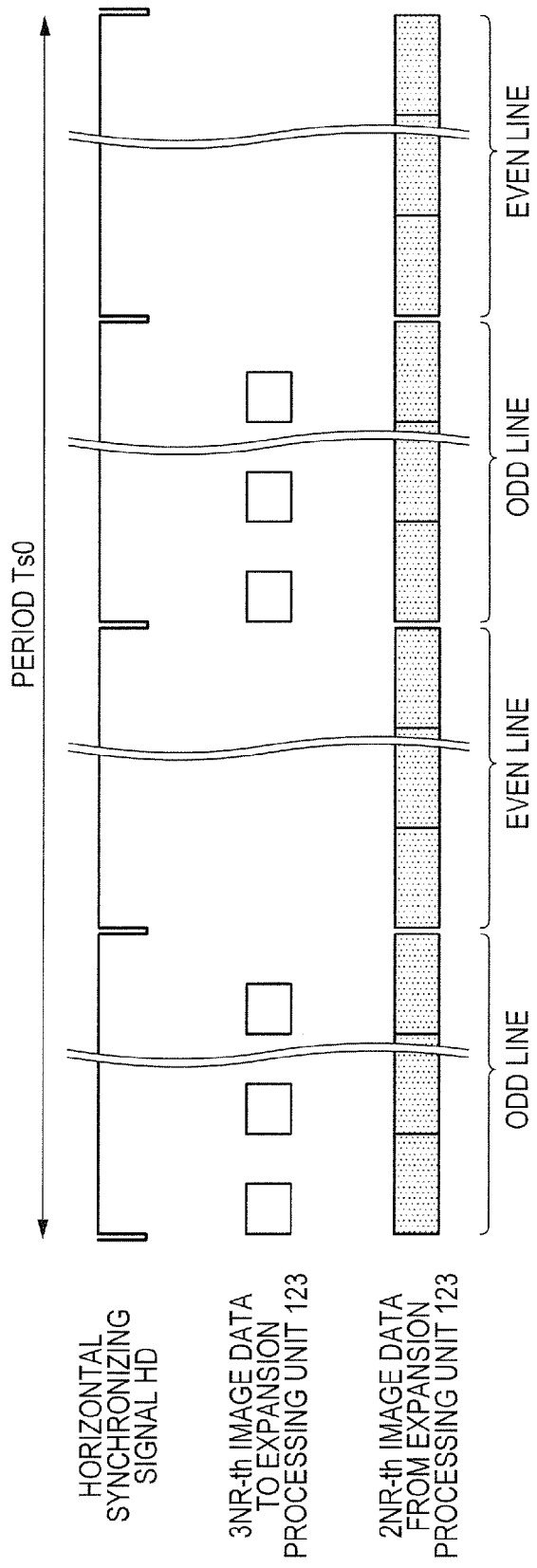

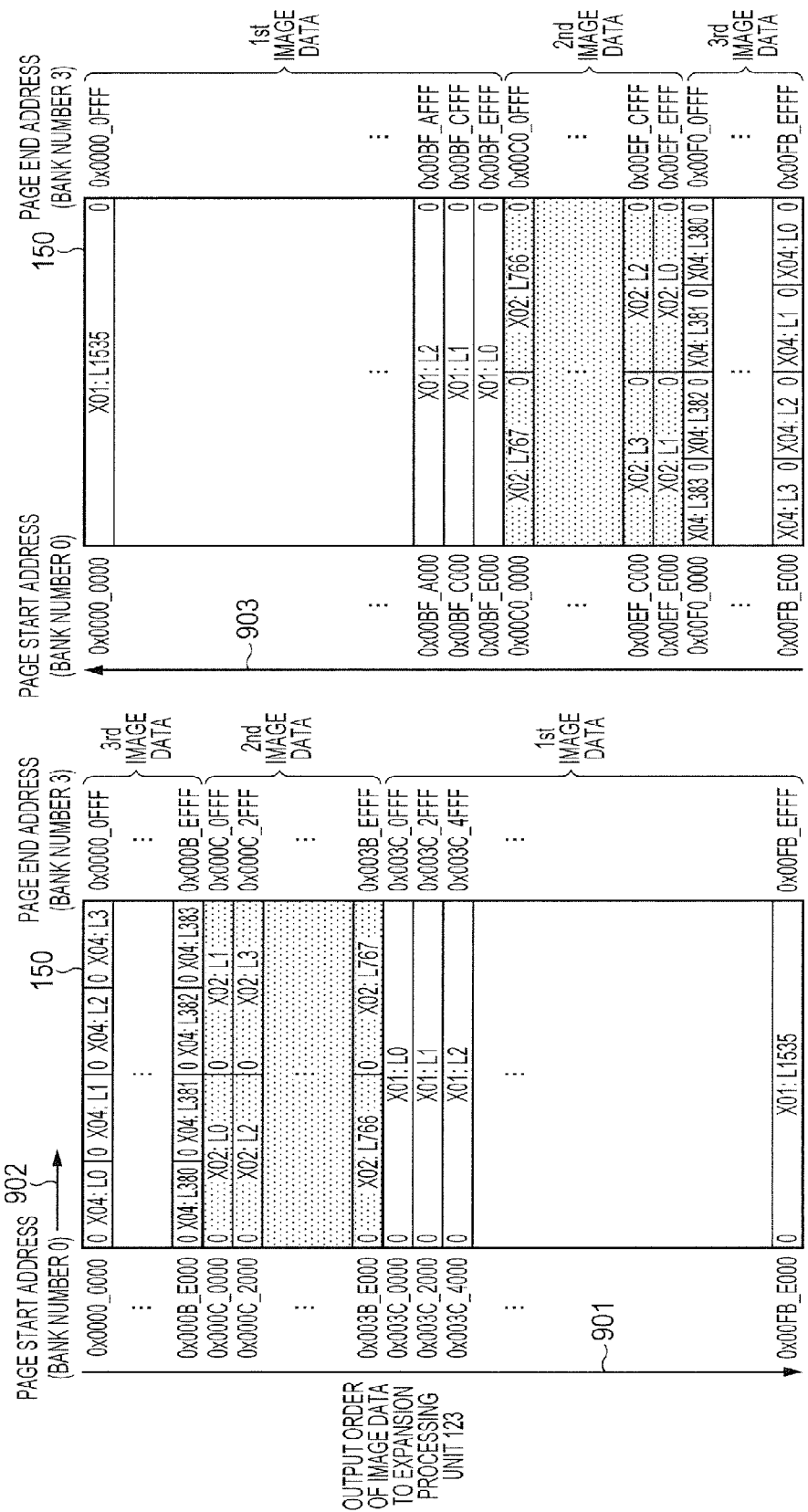

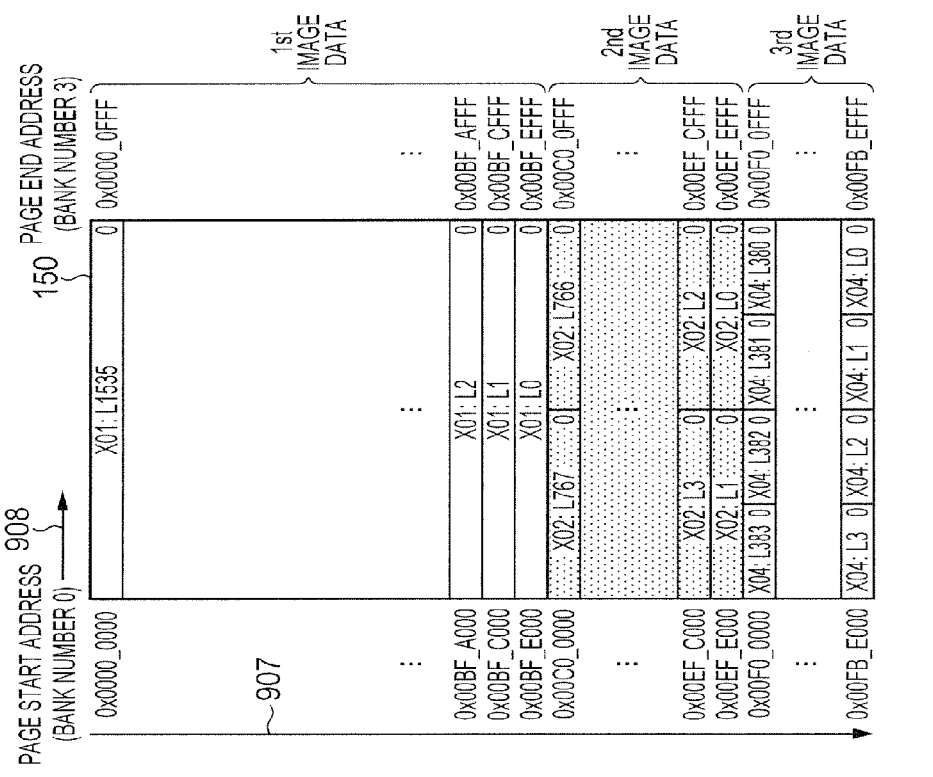
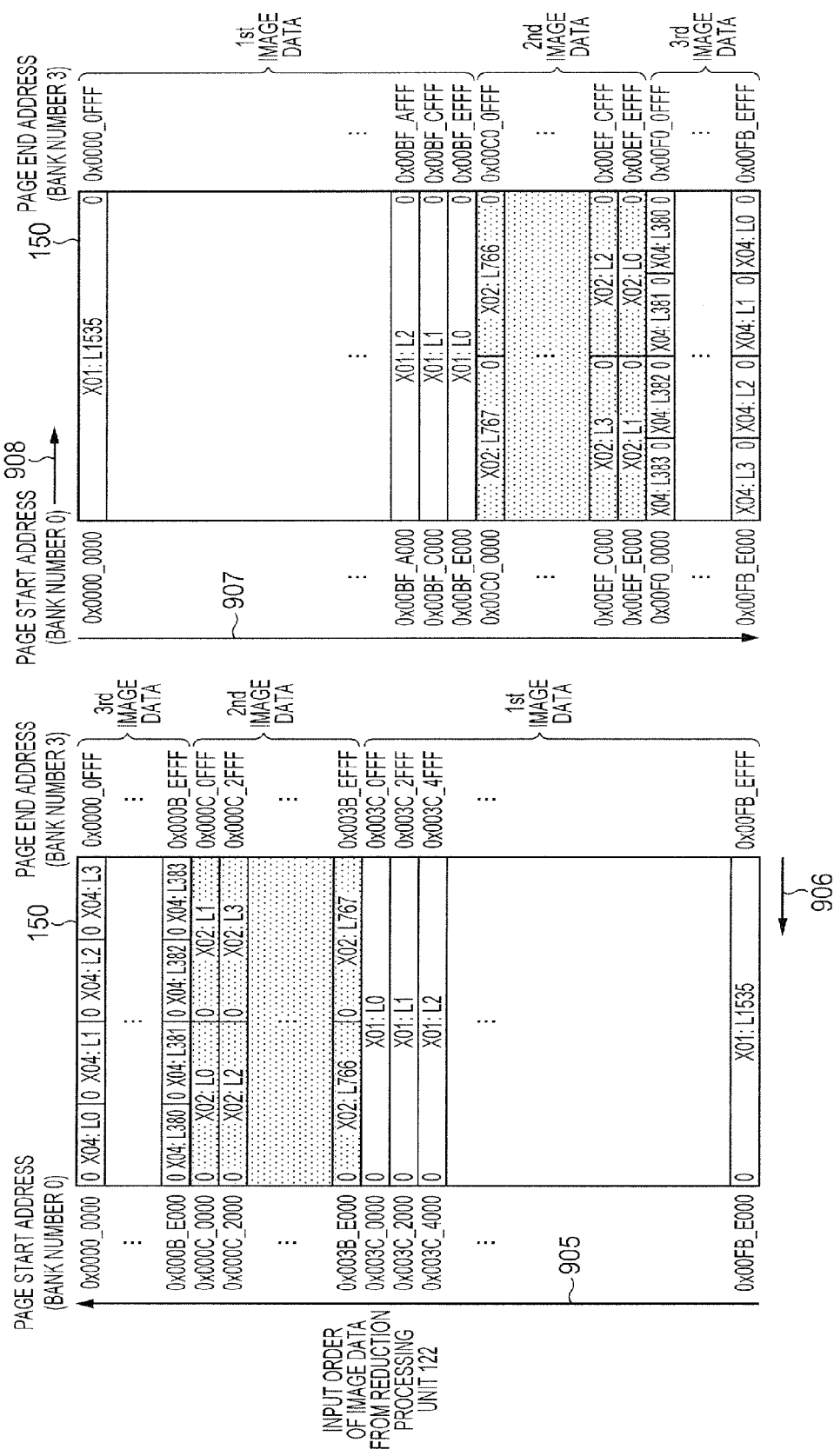

FIG. 11A
ODD FRAME

| PAGE START ADDRESS (BANK NUMBER 0) | | PAGE END ADDRESS (BANK NUMBER 3) | |
|---|---|---|---|
| 0x0000_0000 | 0 X01: L0 | 0x0000_0FFF | 1st IMAGE DATA |
| 0x0000_2000 | 0 X01: L1 | 0x0000_2FFF | |
| 0x0000_4000 | 0 X01: L2 | 0x0000_4FFF | |
| ... | ... | ... | |
| 0x00BF_C000 | 0 X01: L1534 | 0x00BF_EFFF | |
| 0x00BF_E000 | 0 X01: L1535 | 0x00C0_0FFF | |
| 0x00C0_0000 | 0 X02: L0 | 0x00C0_2FFF | 2nd IMAGE DATA |
| 0x00C0_2000 | 0 X02: L2 | | |
| ... | X02: L1 X02: L3 | ... | |
| 0x00EF_C000 | 0 X02: L764 X02: L766 | 0x00EF_0FFF | |
| 0x00EF_E000 | 0 X02: L765 X02: L767 | 0x00EF_EFFF | |
| 0x00F0_0000 | 0 X04: L0 0 X04: L1 0 X04: L2 0 X04: L3 | 0x00F0_0FFF | 3rd IMAGE DATA |
| ... | ... | ... | |
| 0x00FB_C000 | 0 X04: L376 0 X04: L377 0 X04: L378 0 X04: L379 | 0x00FB_CFFF | |
| 0x00FB_E000 | 0 X04: L380 0 X04: L381 0 X04: L382 0 X04: L383 | 0x00FB_EFFF | |

OUTPUT ORDER OF IMAGE DATA TO SYTHESIZING PROCESSING UNIT 123

~1101
1102→

FIG. 11B
EVEN FRAME 1104

PAGE START ADDRESS (BANK NUMBER 0) → 150 PAGE END ADDRESS (BANK NUMBER 3)

| | | | |
|---|---|---|---|
| 0x0000_0000 | 0 X04: L380 0 X04: L381 0 X04: L382 0 X04: L383 | 0x0000_0FFF | 3rd IMAGE DATA |
| ... | 0 X04: L376 0 X04: L377 0 X04: L378 0 X04: L379 | ... | |
| 0x000B_C000 | 0 X04: L0 0 X04: L1 0 X04: L2 0 X04: L3 | 0x000B_CFFF | |
| 0x000B_E000 | 0 X02: L766 X02: L767 | 0x000B_EFFF | 2nd IMAGE DATA |
| 0x000C_0000 | 0 X02: L764 X02: L765 | 0x000C_0FFF | |
| ... | ... | ... | |
| 0x003B_C000 | 0 X02: L2 X02: L3 | 0x003B_CFFF | |
| 0x003B_E000 | 0 X02: L0 X02: L1 | 0x003B_EFFF | |
| 0x003C_0000 | X01: L1535 | 0x003C_0FFF | 1st IMAGE DATA |
| 0x003C_2000 | X01: L1534 | 0x003C_2FFF | |
| ... | ... | ... | |
| 0x00FB_A000 | X01: L2 | 0x00FB_AFFF | |
| 0x00FB_C000 | X01: L1 | 0x00FB_CFFF | |
| 0x00FB_E000 | X01: L0 | 0x00FB_EFFF | |

~1103

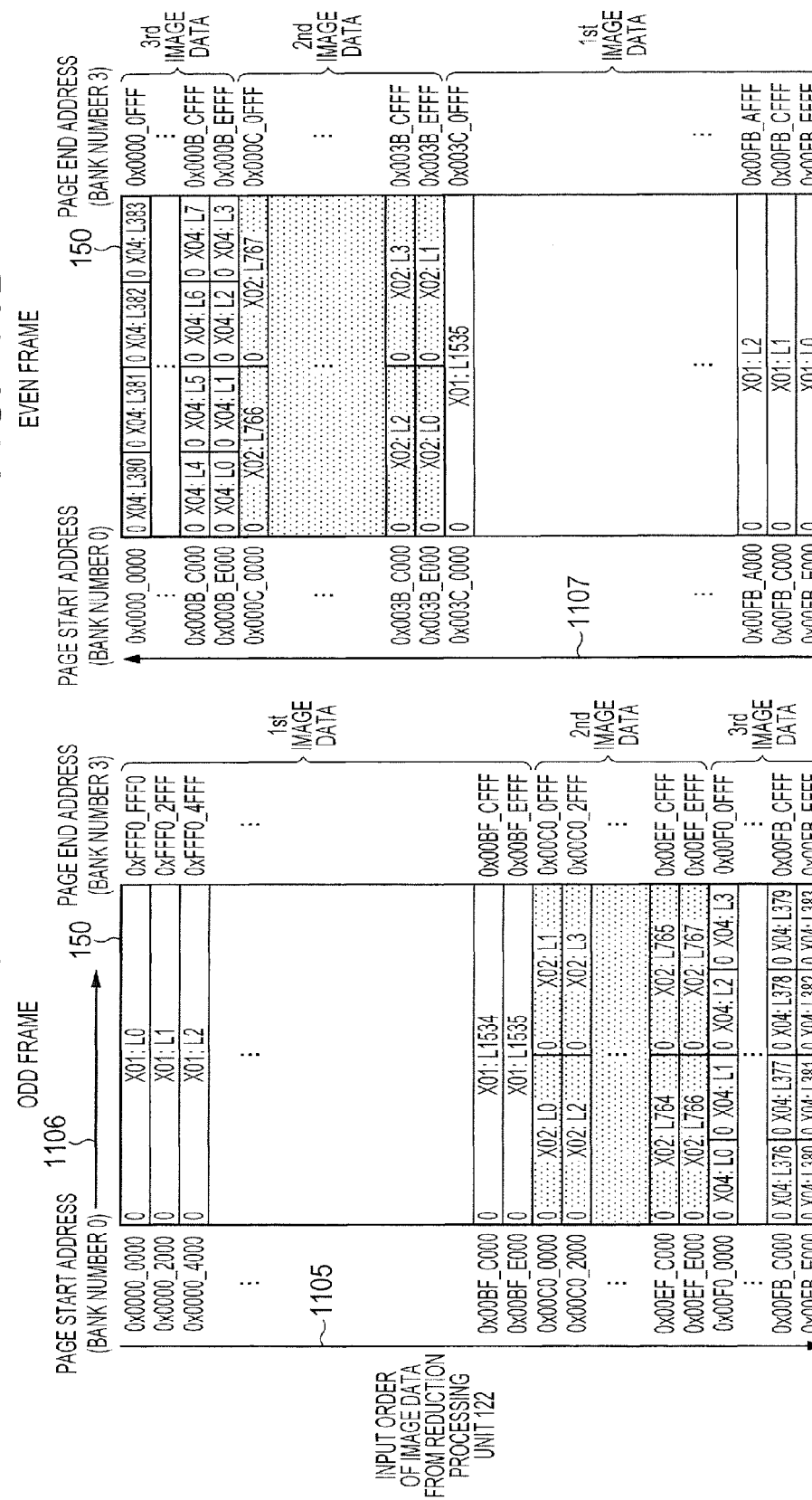

IMAGE PROCESSING APPARATUS, AND CONTROL METHOD AND PROGRAM OF IMAGE PROCESSING APPARATUS

BACKGROUND OF THE INVENTION

Field of the Invention

The present invention relates to an image processing apparatus which transfers image data to a memory such as a DRAM, and a method for controlling the image processing apparatus.

Description of the Related Art

In an image processing apparatus that is used in imaging apparatuses such as a digital camera, image processing such as pixel interpolation, white balance, sharpness, noise reduction and reduction/expansion is performed. For instance, there is a multi-rate signal processing, as one example of noise reduction processing. This processing is a technology of dividing image data into a plurality of frequency bands to create plural types of image data, then subjecting each piece of image data to appropriate filtering processing, and subjecting the image data which has been processed for each frequency band to a frequency synthesizing process again. In such processing, the frequency of access to the memory increases for the reading and writing of the plural types of image data, and in order to reduce a processing time period, image data needs to be efficiently transferred to the memory.

A DRAM (Dynamic Random Access Memory) is generally used as a memory for storing image data therein. The DRAM has a plurality of banks, and in the case where different row addresses (different pages) in the same bank are accessed, a pre-charge command (page close) and an active command (page open) needs to be issued. While these commands are executed, the same bank cannot be accessed. For this reason, the more the frequency of access to different pages in the same bank (frequency of page switching) becomes, the more the pre-charge command and the active command need to be issued, which causes a problem that the access efficiency to the DRAM results in decreasing.

Conventionally, with respect to the problem as described above, such a data transfer method has been proposed as to decrease the frequency of page switching as much as possible to reduce the frequency of the pre-charge, and enhance the efficiency of access to the DRAM. For instance, Japanese Patent No. 3688977 discloses a technology of reducing the frequency of pre-charge, by making image data of a plurality of lines having an equal row address continuously be accessed, when image data of the plurality of lines is accessed, which are stored in the memory.

However, in the case where the noise reduction processing using the multi-rate signal processing as described above is continuously performed on image data of a plurality of frames, plural types of image data need to be read from and written in the memory at the same time. In addition, for instance, in the case where the image data needs to be processed in a determined order when the plural types of image data are written in and read out from the memory, it is difficult to make the line having an equal row address in the same bank in the DRAM to be continuously accessed, as in the technology which has been conventionally disclosed. Accordingly, in the noise reduction processing using the multi-rate signal processing which requires complex memory access, there is such a problem that random-access occurs in different pages in the same bank, and access efficiency for the DRAM decreases.

SUMMARY OF THE INVENTION

The present invention is designed with respect to the above described problem. An object of the present invention is to provide an image processing apparatus which reduces the frequency of occurrence of pre-charge and achieves control showing high memory access efficiency, when continuously subjecting image data of a plurality of frames to noise reduction processing using multi-rate signal processing.

According to an aspect of the present invention, an image processing apparatus comprises: a first image processing unit configured to generate second image data having a pixel number smaller than a pixel number of first image data, wherein the first image processing unit generates a plurality of frames of the second image data corresponding to a plurality of frames of the first image data, and outputs the first and second image data in a first order such that, for each of the frames, the second image data is later than the first image data; a second image processing unit configured to subject the first and second image data to a predetermined process in a second order such that, for each of the frames, the first image data is later than the second image data; a memory having a plurality of storage regions; and a memory control unit configured to control a transferring the image data between the first and second image processing units and the memory, wherein the memory control unit writes, in the first order, in a first storage region of the memory, the first and second image data of a first frame from the first image processing unit, and writes, in the first order, in the first storage region of the memory, the first and second image data of a second frame next to the first frame from the first image processing unit, the memory control unit reads, in the second order, the first and second image data of the first frame from the first image processing unit, to output them to the second image processing unit, and reads, in the second order, the first and second image data of the second frame from the first image processing unit, to output them to the second image processing unit, and, after reading out the second image data of the first frame from the memory, the memory control unit writes the first image data of the second frame into an address at which the second image data of the first frame is stored.

An image processing apparatus according to the present invention can reduce the frequency of occurrence of pre-charge and achieve image processing control showing high memory access efficiency, when continuously subjecting image data of a plurality of frames to noise reduction processing using multi-rate signal processing.

Further features of the present invention will become apparent from the following description of exemplary embodiments with reference to the attached drawings.

BRIEF DESCRIPTION OF THE DRAWINGS

FIG. 6A, FIG. 6B and FIG. 6C are views illustrating a line configuration of the image data in the noise reduction processing of the image processing apparatus according to the first exemplary embodiment of the present invention.

FIG. 7A, FIG. 7B, FIG. 7C and FIG. 7D are views for describing a method of controlling the writing and reading of hierarchical image data in and from a DRAM, in the noise reduction processing of the image processing apparatus according to the first exemplary embodiment of the present invention.

FIG. 9 is a view illustrating a detailed timing chart of one part of the timing chart of FIG. 5.

FIG. 10A, FIG. 10B, FIG. 10C and FIG. 10D are views for describing a method of controlling the writing and reading of hierarchical image data in and from a DRAM, in a noise reduction process of an image processing apparatus according to a first modified example of the first exemplary embodiment of the present invention.

FIG. 11A, FIG. 11B, FIG. 11C and FIG. 11D are views for describing a method of controlling the writing and reading of hierarchical image data in and from a DRAM, in a noise reduction process of an image processing apparatus according to a second modified example of the first exemplary embodiment of the present invention.

DESCRIPTION OF THE EMBODIMENTS

Preferred embodiments of the present invention will now be described in detail in accordance with the accompanying drawings.

First Exemplary Embodiment

Figure 1:
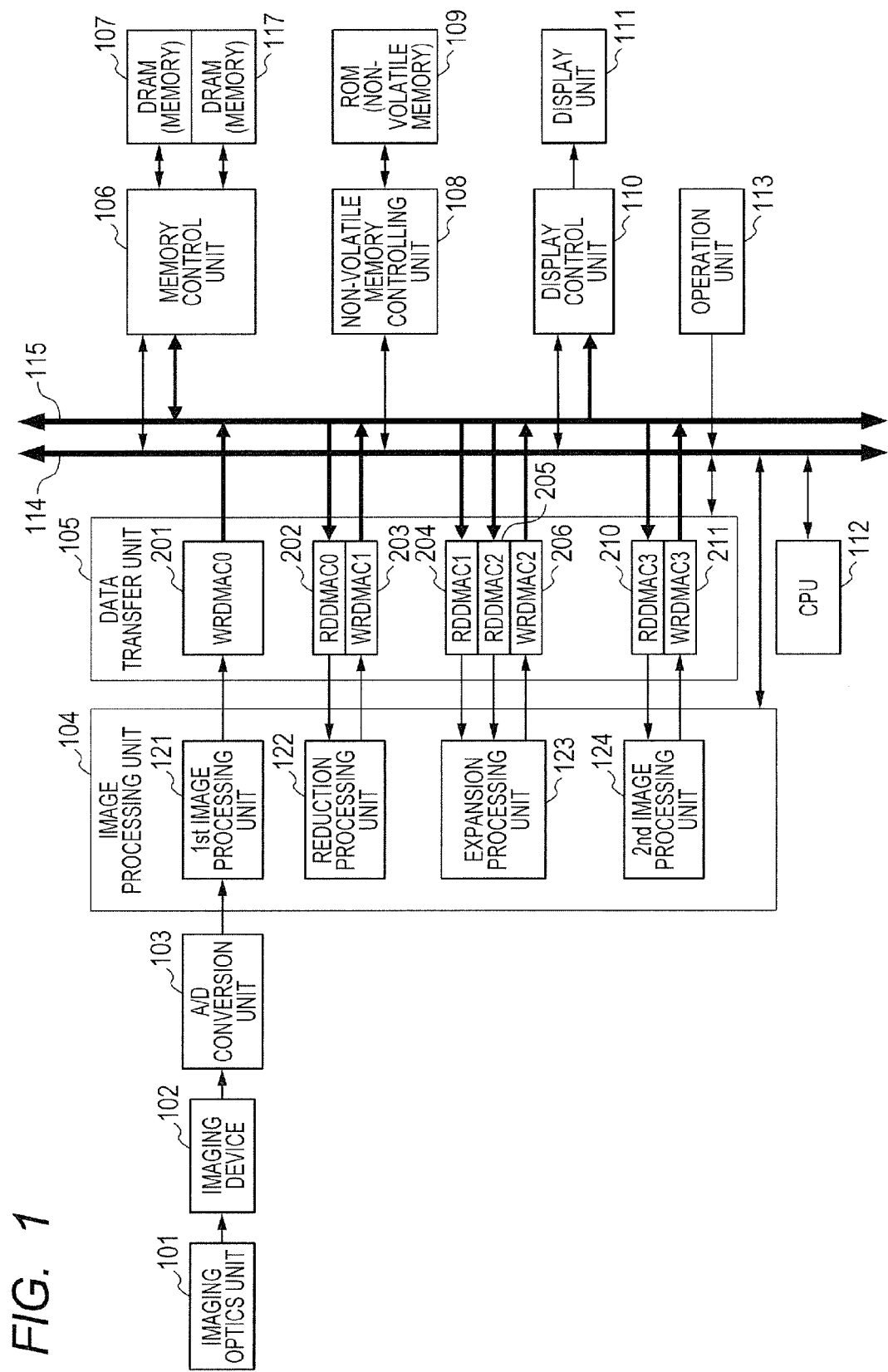
FIG. 1 is a block diagram of an imaging apparatus to which an image processing apparatus according to a first exemplary embodiment of the present invention is applied.

FIG. 1 is a block diagram of an imaging apparatus such as a digital camera, to which an image processing apparatus according to a first exemplary embodiment of the present invention is applied. In FIG. 1, an imaging optics unit 101 has a lens, a diaphragm and the like; and at the time of photographing, the imaging optics unit 101 adjusts a focus and an exposure, and images an optical image on an imaging device 102. The imaging device 102 has a photoelectric conversion function which converts an optical image to an electrical signal (analog image signal), and is structured by a CCD, a CMOS sensor and the like. An A/D conversion unit 103 converts the analog image signal sent from the imaging device 102 to a digital image signal.

A CPU 112 is structured by a microcomputer and the like which control the whole imaging apparatus including the image processing apparatus, gives an operation direction to each functional block, and executes various control processes. A bus 114 is a system bus and a bus 115 is an image data bus. Incidentally, the control may be shared by a plurality of CPUs.

DRAMs (memories) 107 and 117 are memories which store data therein, and have sufficient storage capacity for storing the data such as a predetermined number of still images, a predetermined time period of moving images and sounds, a constant for an operation of the CPU 112, a program and the like therein. A memory control unit 106 writes and reads out data in and from a plurality of storage regions (banks) in DRAMs 107 and 117, according to a direction sent from the CPU 112 or a data transfer unit 105.

A non-volatile memory controlling unit 108 writes and reads out data in and from a ROM (non-volatile memory) 109 according to a direction sent from the CPU 112. The ROM 109 is an electrically erasable/recordable memory, and an EEPROM and the like are used therefor. The ROM 109 stores the constant for the operation of the CPU 112, a program and the like therein.

The CPU 112 controls an image processing unit 104, the data transfer unit 105, the memory control unit 106, the non-volatile memory controlling unit 108, a display control unit 110, an operation unit 113 and the imaging device 102, through the bus 114. The microcomputer executes the program stored in the ROM 109, and thereby achieves each process of the present exemplary embodiment.

The data transfer unit 105 is structured by a plurality of DMACs (Direct Memory Access Controllers) which transfer data. The data transfer unit 105 has four write only direct memory access controllers such as WRDMAC0 201, WRDMAC1 203, WRDMAC2 206 and WRDMAC3 211. The data transfer unit 105 has four read-only direct memory access controllers such as RDDMAC0 202, RDDMAC1 204, RDDMAC2 205 and RDDMAC3 210. Each of the DMACs manages/controls the generation of an address value to be used for the reading or writing of data from or in the DRAM 107, a start address which starts access, a length of data to be transferred, and the like. The control for the generation of the address value includes the control for an operation of incrementing from the start address, and the control for an operation of decrementing from the start address. In addition, by setting an offset value, when accessing the DRAM 107, the image processing apparatus can read and write data even though bypassing a predetermined address value. In order to control the length of the data to be transferred, the data transfer unit sets the number of words as a burst length, which can be continuously accessed by one addressing. Incidentally, in the image processing apparatus according to the present exemplary embodiment, the data transfer unit sets a burst length as 16 words when one word is set at one Byte, and transfers 8 pixels in one transfer when 1 pixel needs 16 bits.

The image processing unit 104 includes a first image processing unit 121, a reduction processing unit 122, an expansion processing unit 123, a second image processing unit 124 and a buffer memory (unillustrated).

The first image processing unit 121 performs the processing such as pixel correction, black level correction, shading correction, defect correction and correction of chromatic aberration of magnification, on image data output from the A/D conversion unit 103. The second image processing unit 124 performs the processing such as compression and decompression processing of the image data, resizing processing of scaling and the like, format conversion processing, development processing and distortion correction processing.

The image data processed by the image processing unit 104 is output to the bus 115 through each of the WRDMACs in the data transfer unit 105, and is written in the DRAMs 107 and 117 by the memory control unit 106. The image data stored in the DRAMs 107 and 117 is read out by the memory control unit 106, is output to the bus 115, and is transferred to the image processing unit 104 through each of the RDDMACs of the data transfer unit 105. The WRDMAC0 201 is connected to the first image processing unit 121, so as to output the image data to the DRAM 117. The RDDMAC0 202 and the WRDMAC1 203 are connected to the reduction processing unit 122, so as to input image data sent from the DRAMs 107 and 117 in the reduction processing unit 122, and so as to output image data sent from the reduction processing unit 122 to the DRAMs 107 and 117, respectively. Similarly, the RDDMAC1 204, the RDDMAC2 205 and the WRDMAC2 206 are each connected to the expansion processing unit 123. The RDDMAC3 210 and the WRDMAC3 211 are connected to the second image processing unit 124.

The reduction processing unit 122 performs the processing of generating a plurality of pieces of image data of different frequency bands, from acquired image data, as a pretreatment of the noise reduction processing. Incidentally, the reduction processing unit 122 can also generate image data of a single frequency, instead of generating image data of different frequency bands, as the pretreatment of the noise reduction processing; and in the present exemplary embodiment, subjects input image data to the reduction processing, and outputs the resultant image data of the single frequency to one DRAM 107.

The expansion processing unit 123 subjects a plurality of pieces of image data of different frequency bands which are stored in the DRAM 107, to appropriate filtering processing, as post treatment of the noise reduction processing, and outputs the resultant image data to the DRAM 107. After that, the expansion processing unit 123 reads out the image data which has been subjected to the filtering processing, from the DRAM 107 again; subjects the read-out image data to expansion processing; performs synthesizing processing of synthesizing the image data subjected to the above expansion processing, with an image obtained by subjecting the image data which has been processed in the reduction processing unit 122 to the noise reduction processing; and outputs the synthesized image data to the DRAM 107.

Incidentally, the reduction processing unit 122 and the expansion processing unit 123 have a line buffer for storing the image data therein. The reduction processing unit 122 and the expansion processing unit 123 temporarily store a plurality of lines of image data to be processed, by using the line buffer; and perform the processing of changing orders of lines to be processed, the processing of inputting/outputting the image data in/from each of the processing units from a position of a finishing end pixel of the line or an position of the finishing end pixel of the length of the data to be transferred, and the like.

A display unit 111 is formed of a liquid crystal display monitor and the like, is controlled by a display control unit 110, and displays various image data and the like on the display unit 111. An operation unit 113 includes a switch and a button which are operated by a user, and is used for an operation of ON/OFF of an electric power source, ON/OFF of a shutter and the like.

A more detailed configuration and a processing operation of an important part of the image processing apparatus according to the present exemplary embodiment will be described below with reference to FIG. 2 to FIG. 9.

Figure 2:
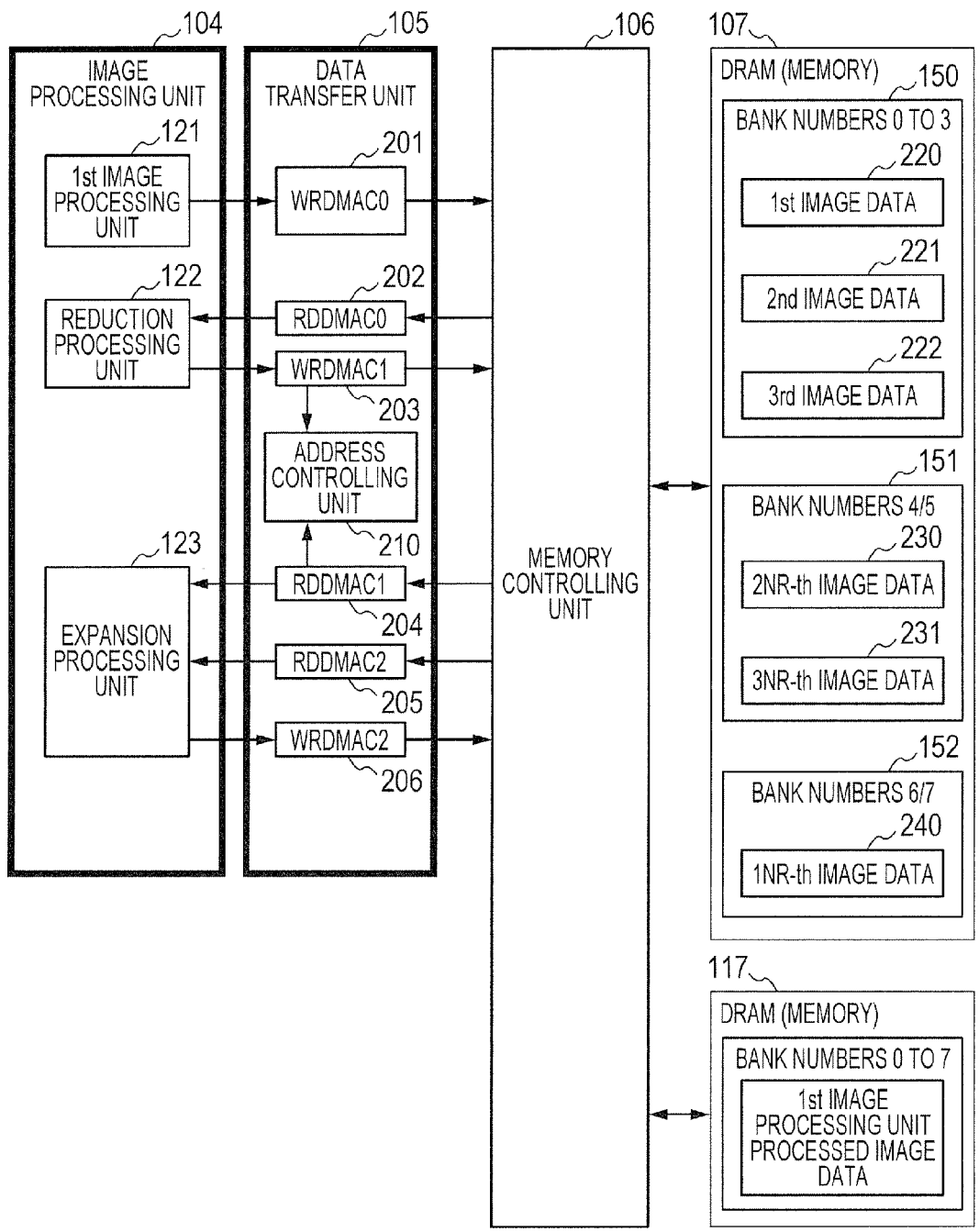
FIG. 2 is a block diagram of an important part of the image processing apparatus according to the first exemplary embodiment of the present invention.

FIG. 2 is a block diagram for describing the image processing unit 104, the data transfer unit 105 and the DRAMs 107 and 117 in detail, which are provided in the image processing apparatus according to the present exemplary embodiment. In FIG. 2, the image data which has been processed by the first image processing unit 121 is stored in the DRAM 117, by the WRDMAC0 201. The image data stored in the DRAM 117 is read out by the RDDMAC0 202, and is sent to the reduction processing unit 122. In FIG. 2, an address controlling unit 210 provided in the data transfer unit 105 adjusts a write address value and a read address value for the DRAMs 107 and 117, which are generated in the WRDMAC1 203 and the RDDMAC1 204, by the unit of a frame. The address controlling unit 210 controls the write address value of the image data sent from the reduction processing unit 122, which is generated by the WRDMAC1 203, so as not to overtake the read address value of the image data to the expansion processing unit 123, which is generated by the RDDMAC1 204. Specifically, when each DMAC controls the address value so as to be incremented, the relationship of (write address value of WRDMAC1 203)<(read address value of RDDMAC1 204) is maintained. On the other hand, when each DMAC controls the address value so as to be decremented, the relationship of (write address value of WRDMAC1 203)>(read address value of RDDMAC1 204) is maintained. In addition, at the same time, the address controlling unit 210 controls a space between the read address value and the write address value so that image data is read out from and image data is written in the same page in the same bank of the DRAM 107, and the space does not exceed a predetermined value which has been set in the address controlling unit 210. Thereby, the frequency of write and readout accesses to the same page of the same bank in the DRAM increases, and the frequency of occurrence of the pre-charge decreases, which enable the data to be efficiently transferred.

Figure 3:
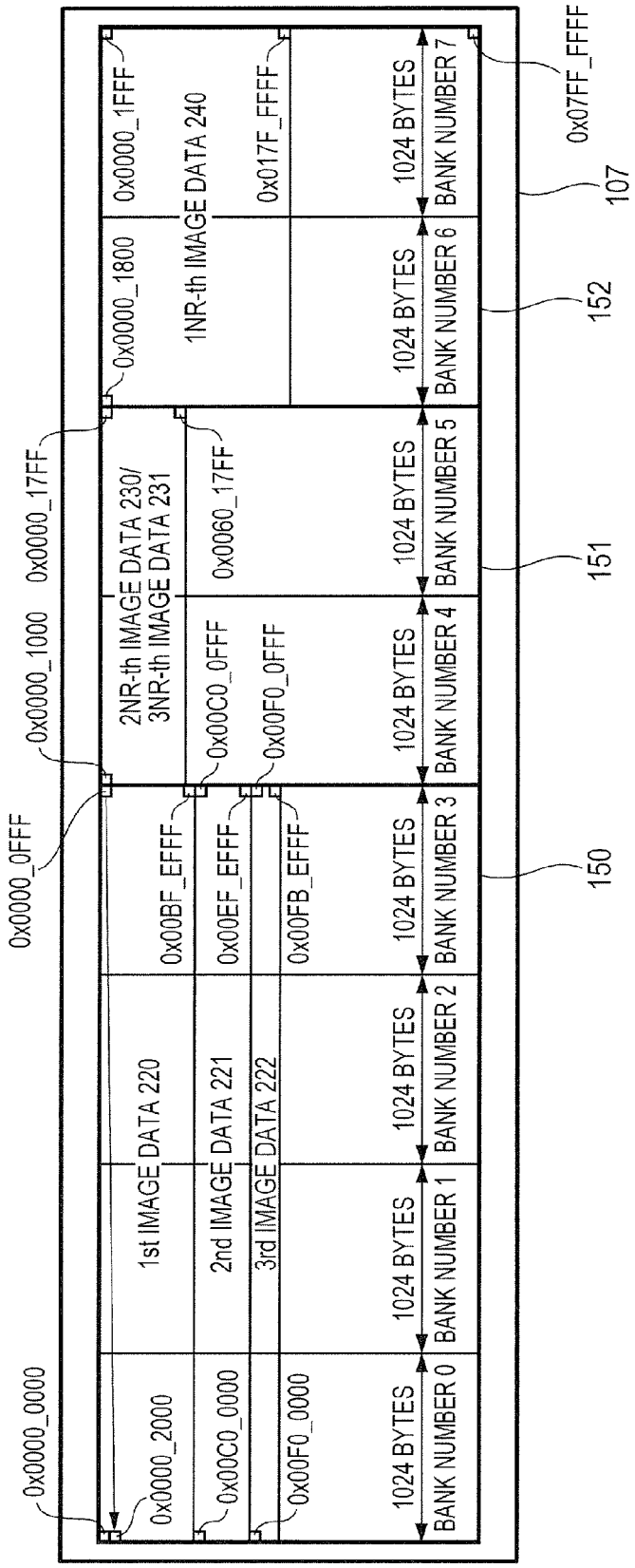
FIG. 3 is a view illustrating the arrangement of a memory of image data in noise reduction processing which is executed by the image processing apparatus according to the first exemplary embodiment of the present invention.

FIG. 3 is a view illustrating an arrangement of memories of image data, according to the noise reduction processing for the DRAM 107. As is illustrated in FIG. 3, the DRAM 107 has a capacity of 128 megabytes (MB) and has a configuration of 8 banks; and each page in the bank has a capacity of 1024 Byte. The DRAM 107 has a memory region which can store the data of 1 Byte per one address therein. With respect to the addresses which are generated in the DMACs, the top address in the bank with the number of 0 in the DRAM 107 corresponds to 0x0000_0000, the top address in the bank with the number of 4 corresponds to 0x0000_1000 and the top address in the bank with the number of 6 corresponds to 0x0000_1800.

Each piece of image data output from the reduction processing unit 122 is stored in the banks with numbers of 0 to 3 (150 in FIG. 2). In addition, the second image data and third image data which have been subjected to the noise reduction processing and are output from the expansion processing unit 123 are stored in the banks with numbers of 4 and 5 (151). The image data subjected to the noise reduction processing, which is the final processing data of the noise reduction processing (hereafter referred to as first NR (Noise Reduced) image data) is stored in the banks with numbers of 6 and 7 (152).

Incidentally, when each piece of image data is read out from and written in the banks with the numbers of 0 to 3, the address value generated in the DMAC is incremented from 0x0000_0000, and the banks with the numbers of 0 to 3 are continuously accessed until the address value reaches the address of 0x0000_0FFF which is the end of the same row address in the bank with the number of 3. After the address value has reached the address value of the end of the page in the bank with the number of 3, an address value is added by a previously set offset value 0x0000_1000, and the address value jumps and flies to an address of 0x0000_2000 of the top part of the page in the bank with the number of 0. After this, the jump processing of the address is performed every time the address value reaches the address of the end of each page in the bank with the number of 3, and thereby the banks with the numbers of 0 to 3 are continuously accessed for the first image data. In addition, the second and the third image data are written from the addresses of 0x00C0_0000 and 0x00F0_0000 of the bank with the number of 0, respectively, and similarly, the banks with the numbers of 0 to 3 are continuously accessed. When data is read and written while the address value is decremented, the bank with the number of 3 is accessed from the address of the end of the page in the bank while the address is decremented. Then, when the address value has reached the address value of the top part of the page in the bank with the number of 0, the address value is subtracted by an offset value of 0x0000_0000, jump processing is performed, and the address of the end of the page in the bank with the number of 3 is accessed.

Similarly, when image data which are the third image data and the second image data that have been already subjected to noise reduction processing (hereafter referred to as the third NR image data and the second NR image data), respectively, are read out from and written in the banks with the numbers of 4 and 5, the banks are sequentially accessed from the top of the page in the bank with the number of 4, and when the address value has reached the end address of the page in the bank with the number of 5, the address value jumps by the offset value of 0x0000_1800. Thus, the second and third NR image data are continuously written in the banks with the numbers of 4 and 5, and are written in the addresses up to the address of 0x0060_17FF. In addition, when the first NR image data is read out from and written in the banks with the numbers of 6 and 7, the banks are sequentially accessed from the 0x0000_1800 of the top of the page in the bank with the number of 6, and when the address value has reached the end address 0x0000_1FFF of the page in the bank with the number of 7, the address value jumps by the offset value of 0x0000_1800. Thus, the first NR image data is continuously written in the banks with the numbers of 6 and 7, and is written in the addresses up to the address 0x017F_FFFF. The reading and writing are controlled in this way, and thereby when the second and third NR image data and the first NR image data are read and written, the access is continuously performed.

Figure 4:
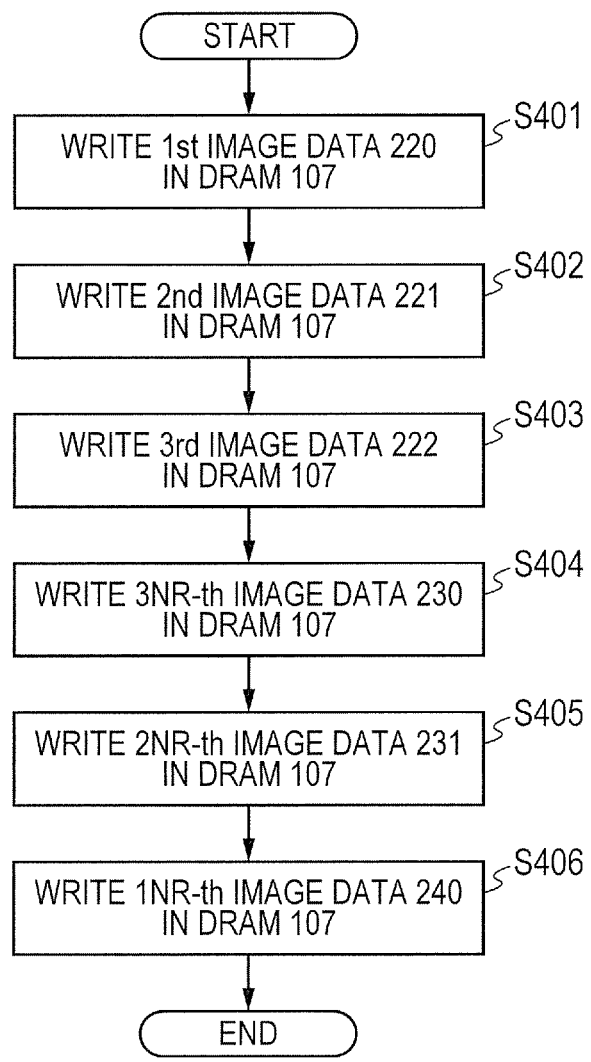
FIG. 4 is a view illustrating a flow chart of a noise reduction processing operation of the image processing apparatus according to the first exemplary embodiment of the present invention.

FIG. 4 is a view illustrating a process flow chart of noise reduction processing which is performed in an image processing apparatus of the present invention. The noise reduction processing according to the present exemplary embodiment will be described below, according to the flow chart in FIG. 4. Incidentally, the present processing is achieved by the CPU 112 which executes the program that is stored in the ROM 109. In addition, the processing of FIG. 4 is performed when an image data of one screen is acquired from the imaging device 102. In addition, the processing of FIG. 4 is performed for each screen when image data of a plurality of screens are continuously acquired at a predetermined space between frames.

Processing of Step S401:

The first image processing unit 121 acquires image data output from A/D conversion unit 103, and performs various processes on the image data, such as pixel correction, black level correction, shading correction, defect correction, and a correction of chromatic aberration of magnification. The image data which have been subjected to the processing are written in the banks with the numbers of 0 to 7 of the DRAM 117. The RDDMAC0 202 reads out image data which have been subjected to various processes in the first image processing unit 121 from the DRAM 117. The read-out image data is subjected to appropriate filtering processing in the reduction processing unit 122, and the processed image data is written in the banks with the numbers of 0 to 3 in the DRAM 107 by the unit of the set length of the data to be transferred through the WRDMAC0 201, as the first image data 220. An image size of the first image data 220 to be processed in the present exemplary embodiment shall be horizontal 2,048 pixels×vertical 1,536 pixels (1 pixel=16 bits).

Processing of Step S402:

The reduction processing unit 122 reads out the first image data 220 from the DRAM 107 through the RDDMAC0 202. Then, the reduction processing unit 122 subjects a plurality of lines to appropriate filtering processing, and reduces the image size by reducing the number of pixels so as to become the number of pixels of a half of that in the first image data, in both of horizontal and vertical directions. The reduction processing unit 122 outputs the image data which has been subjected to the reduction processing to the WRDMAC1 203. The WRDMAC1 203 outputs the reduced image data to the memory control unit 106, and the memory control unit 106 writes the image data in the banks with the numbers of 0 to 3 in the DRAM 107, as second image data 221. The image size of the second image data 221 becomes horizontal 1,024 pixels×vertical 768 pixels (1 pixel=16 bits).

Processing of Step S403:

The reduction processing unit 122 reads out the second image data 221 from the DRAM 107 through the RDDMAC0 202. Then, the reduction processing unit 122 subjects a plurality of lines to appropriate filtering processing, and reduces the image size by reducing the number of pixels so as to become the number of pixels of a half of that in the second image data, in both of horizontal and vertical directions. The reduction processing unit 122 outputs the image data which has been subjected to the reduction processing to the WRDMAC1 203. The WRDMAC1 203 outputs the reduced image data to the memory control unit 106, and writes the image data in the banks with the numbers of 0 to 3 in the DRAM 107, as third image data 222. The image size of the third image data 222 becomes horizontal 512 pixels×vertical 384 pixels (1 pixel=16 bits).

As in the above description, three image data which are the image data in different frequency bands are generated from the input image data of the same screen, by the processes of Steps S401 to S403. Incidentally, as illustrated in FIG. 3, the first image data 220, the second image data 221 and the third image data 222 are stored in the banks with the numbers of 0 to 3 in the DRAM 107.

Processing of Step S404:

After the third image data has been written in the DRAM 107 by the reduction processing unit 122, the expansion processing unit 123 reads out the third image data 222 from the DRAM 107 through the RDDMAC1 204. Then, the expansion processing unit 123 subjects the read-out third image data to filtering processing for reducing the noise. The expansion processing unit 123 outputs the third image data which has been subjected to the noise reduction processing, to the WRDMAC2 206. The WRDMAC2 206 outputs the third image data which has been subjected to the noise reduction processing, to the memory control unit 106, and the memory control unit 106 writes the image data in the banks with the numbers of 4 and 5 in the DRAM 107 (151 in FIG. 2), as the third NR image data 231. The image size of the third NR image data 231 becomes horizontal 512 pixels×vertical 384 pixels (1 pixel=16 bits).

Processing of Step S405:

The expansion processing unit 123 reads out the second image data 221 from the DRAM 107 through the RDDMAC1 204. Then, the expansion processing unit 123 subjects the read-out second image data to filtering processing for reducing the noise. In addition, at the same time when subjecting the second image data to the filtering processing for reducing the noise, the expansion processing unit 123 reads out the third NR image data 231 from the DRAM 107 through the RDDMAC2 205 by the unit of the set length of the data to be transferred. Then, the expansion processing unit 123 subjects the read-out third NR image data to processing of increasing the number of pixels of the image data to two times both in horizontal and vertical directions, and consequently expanding the image size to four times. Furthermore, the expansion processing unit 123 synthesizes image data which is the second image data 221 that has been subjected to the noise reduction processing, with image data which is the third NR image data 231 that has been subjected to the expansion processing, according to a predetermined synthesis ratio. The expansion processing unit 123 outputs the image data which has been subjected to the synthesizing processing, to the memory control unit 106, and the memory control unit 106 writes the image data in the banks with the numbers of 4 and 5 in the DRAM 107 through the WRDMAC2 206, as a second NR hierarchical image data 230. The image size of the second NR image data 230 becomes horizontal 1,024 pixels×vertical 768 pixels (1 pixel=16 bits).

Incidentally, the details of readout control for the third NR image data 231 and write control for the second NR image data 230 in the banks with the numbers of 4 and 5 in the DRAM 107 will be described later.

Processing of Step S406:

The expansion processing unit 123 reads out the first image data 220 from the DRAM 107 through the RDDMAC1 204 by the unit of the set length of the data to be transferred, and subjects the first image data to filtering processing for reducing the noise. At the same time when subjecting the first image data to the filtering processing for reducing the noise, the expansion processing unit 123 reads out the second NR image data 230 from the DRAM 107 through the RDDMAC2 205. Then, the expansion processing unit 123 subjects the read-out second NR image data to the processing of increasing the number of pixels of the image data to two times both in horizontal and vertical directions, and consequently expanding the image size to four times. Furthermore, the expansion processing unit 123 synthesizes image data which is the first image data 220 that has been subjected to the noise reduction processing, with image data which is the second NR image data 230 that has been subjected to the expansion processing, according to a predetermined synthesis ratio. The expansion processing unit 123 outputs the image data which has been subjected to the synthesizing processing, to the memory control unit 106, and the memory control unit 106 writes the image data in the banks with the numbers of 6 and 7 in the DRAM 107 through the WRDMAC2 206, as the first NR image data 240. The image size of the first NR image data 240 becomes horizontal 2,048 pixels×vertical 1,536 pixels (1 pixel=16 bits).

As in the above description, the noise reduction processing for the image data of one screen is completed by the processes of Steps S401 to S406. Incidentally, as is illustrated in ordinary FIG. 3, a storing position of the first to third image data 220 to 222 and a storing position of the second and third NR image data 230 and 231 are arranged dividedly in banks with the numbers of 0 to 4 and banks with the numbers of 4/5, in the DRAM 107. An object of the present arrangement is to disperse the access of the first to third image data 220 to 222 and the access of the second and third NR image data 230 and 231 to different banks, and thereby to make the different image data access the different banks in parallel while suppressing the lowering of access efficiency.

In the above described processes of Steps S401 to S406, the reduction processing unit 122 writes the first image data 220, the second image data 221 and the third image data 222 in the DRAM 107 in this order. On the other hand, the expansion processing unit 123 reads out the third image data 222, the second image data 221 and the first image data 220 from the DRAM 107 in the reverse order, and processes the data.

Figure 5:
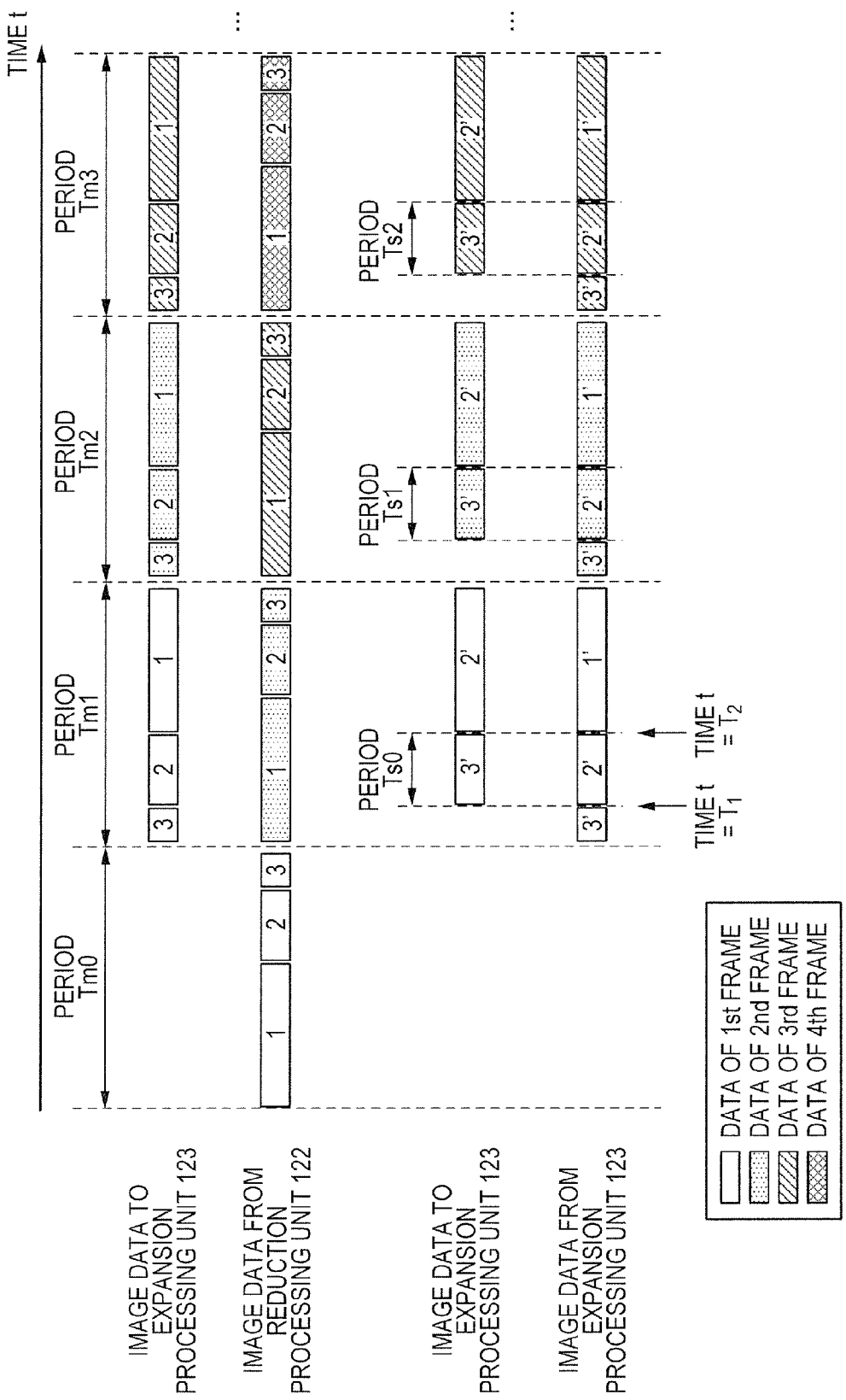
FIG. 5 is a view illustrating a timing chart of the noise reduction processing of the image processing apparatus according to the first exemplary embodiment of the present invention.

FIG. 5 is a timing chart illustrating processing timing in the case where the image data of a plurality of frames are continuously subjected to the above described noise reduction processing. Periods 1, 2 and 3 are illustrated in the figure, during which the first image data, the second image data and the third image data are read out from or written in the DRAM 107, respectively. Similarly, periods 1', 2' and 3' are illustrated during which the first NR image data, the second NR image data and the third NR image data are read out from or written in the DRAM 107, respectively.

Firstly, input and output processes each for the first to third image data will be described. In a period Tm0 in FIG. 5, the first, second and third image data of the first frame are sequentially output to the DRAM 107 from the reduction processing unit 122 (corresponding to Steps S401 to S403 for first frame in process flow in FIG. 4).

In a subsequent period Tm1, the expansion processing unit 123 reads out each of the third, second and first image data of the first frame from the DRAM 107 (corresponding to Steps S404 to S406 for first frame in process flow in FIG. 4). At the same time, in the period Tm1, the first, second and third image data of a second frame are sequentially output to the DRAM 107 from the reduction processing unit 122 (corresponding to Steps S401 to S403 for second frame in process flow in FIG. 4).

After this, similarly in a period Tm2, the expansion processing unit 123 reads out sequentially each of the third, second and first image data of the second frame from the DRAM 107 (corresponding to Steps S404 to S406 for second frame in process flow in FIG. 4). At the same time, in the period Tm2, the first, second and third image data of a third frame are sequentially output to the DRAM 107 from the reduction processing unit 122. Also after the period Tm3, similar processes are repeated.

Next, input and output processes of image data which has been subjected to the noise reduction processing will be described below. In the period Tm1, the expansion processing unit 123 subjects the third image data which has been input thereto, to filtering processing for reducing the noise, and outputs the third NR image data (corresponding to Step S404 for first frame in process flow in FIG. 4). Subsequently, the expansion processing unit 123 performs the synthesizing processing of the second image data with the third NR image data, and outputs the second NR image data (corresponding to Step S405 for first frame in process flow in FIG. 4). After that, the expansion processing unit 123 subjects the first image data to the noise reduction processing, then subjects the resultant data to synthesizing processing with the second NR image data, and outputs the first NR image data (corresponding to Step S406 for first frame in process flow in FIG. 4).

In the subsequent period Tm2, similar processing is performed on the second frame, and in the period Tm3, similar processing is performed on the third frame. Also after the period Tm3, similar processing is repeated.

In the DRAM 107, memory regions other than a region for the noise reduction processing illustrated in FIG. 3 may occasionally be used as a data storing region for other processes. Because of this, also in the case where image data of a plurality of frames are continuously subjected to the noise reduction processing, it is desirable to control the memory region which is used for the noise reduction processing so as not to increase. For this purpose, it is considered to overwrite image data of the next frame on the memory region from which the image data of the previous frame has been already read out.

However, in the case of the noise reduction processing which is performed by the image processing apparatus according to the present exemplary embodiment, the order of image data of the previous frame, which is read out so as to be input in the expansion processing unit 123, is reverse to the order of image data of the next frame, which is output from the reduction processing unit 122. Therefore, in the case where the image data of the next frame is simply overwritten on the memory region in which the image data of the previous frame having been already read out has been stored, it becomes complicated to control the address generation in the DMAC. Furthermore, if the number of image data increases which are generated from original image data, the control becomes more complicated.

A method will be described below which prevents the memory region from increasing in the noise reduction processing that is performed by the image processing apparatus according to the present exemplary embodiment, and achieves such an access processing as to reduce the frequency of the occurrence of pre-charge, with a simple control for the address generation in the DMAC.

In the period Tm1 of FIG. 5, the first to third image data of the second frame, which have been output from the reduction processing unit 122, are overwritten in the memory region where the first to third image data of the first frame have been stored, which have been output to the expansion processing unit 123. Similarly, the first to third image data of the next frame, which have been output from the reduction processing unit 122, are overwritten in the memory region where the first to third image data of the previous frame have been stored after the period Tm2, which have been output to the expansion processing unit 123. By the method of overwriting as in the present processing, even in the case where the image data of the plurality of frames are continuously subjected to the noise reduction processing, the processing in the same region as the memory region for the first to third image data is enabled in the banks with the numbers of 0 to 3, which are illustrated in FIG. 3.

Next, a method for controlling the access to the DRAM 107 will be described below, in the case where image data of a plurality of frames are continuously subjected to the noise reduction processing, which have been input in the image processing unit 104. FIG. 6A to FIG. 6C are views illustrating a line configuration of the image data which the image processing apparatus of the present invention subjects to the noise reduction processing. In FIG. 6A to FIG. 6C, each line of the first, second and third image data are illustrated by X01, X02 and X04, respectively.

FIG. 6A illustrates a line configuration of the first image data 220 which has horizontal 2,048 pixels×vertical 1,536 pixels. A coordinate in the horizontal direction of the image data shall be represented by H, and a coordinate in the vertical direction of the image data shall be represented by V. X01:L0 (coordinate V=0) of the first line of the image data is represented by 601; X01:L1 (coordinate V=1) of the second line is represented by 602; X01:L2 (coordinate V=2) of the third line is represented by 603; and so on. X01:L1535 (coordinate V=1,535) of the last 1,536th line is represented by 671, and each line has 2,048 pixels.

FIG. 6B illustrates a line configuration of the second image data 221 which has horizontal 1,024 pixels×vertical 768 pixels. X02:L0 (coordinate V=0) of the first line of the image data is represented by 611; X02:L1 (coordinate V=1) of the second line is represented by 612; X02:L2 (coordinate V=2) of the third line is represented by 613; and so on. X02:L767 of the last 768th line is represented by 681, and each line has 1,024 pixels.

FIG. 6C illustrates a line configuration of the third image data 222 which has horizontal 512×vertical 384 pixels. X04:L0 (coordinate V=0) of the first line of the image data is represented by 621; X04:L1 (coordinate V=1) of the second line is represented by 622; and so on. X04:L383 of the last 384th line is represented by 691, and each line has 512 pixels. Incidentally, the position (coordinate H=0) of '0' in the left end part of each line in FIG. 6A to FIG. 6C denotes the position of the starting end pixel of each line.

FIG. 7A to FIG. 7D are views illustrating a method of controlling the writing and reading of image data in and from the DRAM 107 in the case where image data of a plurality of frames are continuously subjected to the noise reduction processing. In FIG. 7A to FIG. 7D, the first, second and third image data which are stored in the DRAM 107 are illustrated by X01, X02 and X04, respectively. As has been described above, the first, second and third image data 220 to 222 are stored in the banks with the numbers of 0 to 3 in the DRAM 107. FIG. 7A is a view illustrating a reading order of the image data of odd-numbered frames, which are output to the expansion processing unit 123. FIG. 7B is a view illustrating a reading order of the image data of even-numbered frames, which are output to the expansion processing unit 123. FIG. 7C is a view illustrating a writing order of the image data of the odd-numbered frames, which have been output from the reduction processing unit 122. FIG. 7D is a view illustrating a writing order of the image data of the even-numbered frames, which have been output from the reduction processing unit 122.

A method of controlling the access to the memory region in banks with the numbers of 0 to 3 in the DRAM 107 in the case where image data of a plurality of frames are continuously subjected to the noise reduction processing will be described below, according to the timing chart for processing image data in FIG. 5. Incidentally, as is illustrated in FIG. 3, the first to third image data are stored in the memory regions in the banks with the numbers of 0 to 3 in the DRAM 107.

In the period Tm0 of FIG. 5, as is illustrated in FIG. 7C, the first image data of the first frame is written in the DRAM 107, which has been output from the reduction processing unit 122. In this case, the first image data is written, while an address 0x0000_0000 is determined to be the start address and the address value is incremented by the unit of a length of data to be transferred (0x0000_0010: corresponding to 8 pixels). A subsequent second image data of the first frame is written in the DRAM 107, while an address 0x00C0_0000 is determined to be the start address and the address value is incremented by the unit of a length of data to be transferred. A subsequent third image data of the first frame is written in the DRAM 107, while an address 0x00F0_0000 is determined to be the start address and the address value is incremented by the unit of a length of data to be transferred. An arrow 705 of FIG. 7C illustrates a direction in which the row address (page) is incremented, and an arrow 706 illustrates a direction in which the column address is incremented. Hereafter, in the first exemplary embodiment, the increment and decrement of the address value shall be performed by the unit of a set length of data to be transferred.

In the period Tm1 of FIG. 5, the expansion processing unit 123 reads out image data, while an address 0x00FB_EFFF including the position of the finishing end pixel of the third image data of the first frame is determined to be the start address, and the address value is decremented, as is illustrated in FIG. 7A. Then, after the expansion processing unit 123 has started the readout of the third image data of the first frame, while the readout is continued, the reduction processing unit 122 writes the first image data of the second frame in the same page, as is illustrated in FIG. 7D. Specifically, the reduction processing unit 122 writes the first image data of the second frame, while an address 0x00FB_EFFF is determined to be the start address and the address value is decremented. An arrow 701 of FIG. 7A illustrates a direction in which the row address (page) is decremented, and an arrow 702 illustrates a direction in which the column address is decremented. Similarly, an arrow 707 of FIG. 7D illustrates a direction in which the row address is decremented, and an arrow 708 illustrates a direction in which the column address is decremented.

Incidentally, as described above, the address controlling unit 210 included in the data transfer unit 105 adjusts a write address and a read address in the DRAM 107, which are generated in the WRDMAC1 203 and the RDDMAC1 204, respectively. Thereby, the address to be written through the WRDMAC1 203 does not overtake the address to be read out through the RDDMAC1 204, and a space between the addresses is kept within a set predetermined value. Thereby, the frequency of write and readout accesses to the same page of the same bank in the DRAM 107 increases, and the frequency of occurrence of the pre-charge decreases, which enable the data to be efficiently transferred. Incidentally, at the time when the read address of the third image data of the first frame has reached the top address 0x00FB_E000 of the bank with the number of 0, the first image data of the second frame is in the midst of being written in the same page. On the other hand, the read address of the third image data jumps to the end address of the previous page in the bank with the number of 3. Thus, though the page of the write address is different from the page of the write address, the read address and the write address exist in different banks from each other, and accordingly the access becomes bank interleave access. For this reason, the image processing unit can perform the readout of the third image data of the first frame and the writing of the first image data of the second frame in parallel, without waiting for opening and closing of the page.

Subsequently, as is illustrated in FIG. 7A, the expansion processing unit 123 reads out image data from an address 0x00EF_EFFF including the position of the finishing end pixel of the second image data X02 of the first frame so as to input the image data therein, after having completed the readout of the third image data of the first frame. After the readout of the second image data of the first frame has been completed, image data is read out from an address 0x00BF_EFFF including the position of the finishing end pixel of the first image data of the first frame. Similarly to the readout of the third image data of the first frame, the readout processes of the second image data and first image data are also performed while the address value is decremented.

Then, after the expansion processing unit 123 has started the readout of the second image data of the first frame, while the readout is continued, the second image data of the second frame is written in the DRAM 107 while an address 0x003B_EFFF is determined to be the start address, as is illustrated in FIG. 7D. After the writing of the second image data of the second frame has been completed, the third image data of the second frame is written in the DRAM 107, while an address 0x000B_EFFF is determined to be the start address. Similarly to the writing of the first image data of the first frame, the write processes of the second image data and the third image data are also performed while the address value is decremented.

Thus, in the period Tm1, the first to third image data which have been output from the reduction processing unit 122 are written in the region in a form of chasing the read-out data, in which the third to first image data have been stored that the expansion processing unit 123 has completely read out.

An arrangement of each piece of image data in the DRAM 107, which is illustrated in FIG. 7D, becomes such an arrangement that the arrangement of the image data in FIG. 7A is reversed in horizontal and vertical directions.

In the period Tm2 of FIG. 5, the expansion processing unit 123 reads out image data while an address 0x0000_0000 at the position of the finishing end pixel of the third image data of the second frame is determined to be the start address, and the address value is incremented, as is illustrated in FIG. 7B. At the same time, as is illustrated in FIG. 7C, the first image data of the third frame is written in the DRAM 107, which has been output from the reduction processing unit 122, while an address 0x0000_0000 is determined to be the start address and the address value is incremented. An arrow 703 of FIG. 7D illustrates a direction in which the row address is incremented, and an arrow 704 illustrates a direction in which the column address is incremented.

Incidentally, similarly to the processing in the period Tm1, the address controlling unit 210 controls the address to be written through the WRDMAC1 203 so as not to overtake the address to be read out through the RDDMAC1 204, and controls a space between the addresses so as to be kept within a set predetermined value. Thereby, the frequency of write and readout accesses to the same page of the same bank in the DRAM 107 increases, and the frequency of occurrence of the pre-charge decreases, which enable the data to be efficiently transferred.

Subsequently, as is illustrated in FIG. 7B, the second image data of the second frame is read out from an address 0x000C_0000 at the position of the finishing end pixel, after the readout of the third image data of the first frame which the expansion processing unit 123 has been completed. After the readout of the second image data of the second frame has been completed, the first image data of the second frame is read out from an address 0x003C_0000 at the position of the finishing end pixel. Similarly to readout of the third image data of the second frame, the readout processes of the second and first image data are also performed while the address value is incremented.

Then, after the expansion processing unit 123 has started the readout of the second image data of the second frame, while the readout is continued, the second image data of the third frame is written in the DRAM 107 while an address 0x00C0_0000 is determined to be the start address, as is illustrated in FIG. 7C. After the writing of the second image data of the third frame has been completed, the third image data of the third frame is written in the DRAM 107, while an address 0x00F0_0000 is determined to be the start address. Similarly to the writing of the first image data of the first frame, the write processes of the second and third image data are also performed while the address value is incremented.

Thus, also in the period Tm2, the image data of the next frame, which has been output from the reduction processing unit 122, is written in the region in which the image data has been stored that the expansion processing unit 123 has read out.

After this, in the period Tm3, similar processing to that in the period Tm1 is performed, and the similar processes to those in the period Tm1 and the period Tm2 are repeated alternately.

A method of controlling the access to the banks with the numbers of 4 to 5 in the DRAM 107 in the case where the image processing unit 104 continuously subjects image data of a plurality of frames to the noise reduction processing will be described, according to the timing chart in FIG. 5. Incidentally, as is illustrated in FIG. 3, the second NR and third NR image data are stored in the memory regions in the banks with the numbers of 4 to 5 in the DRAM 107.

Figure 8A:
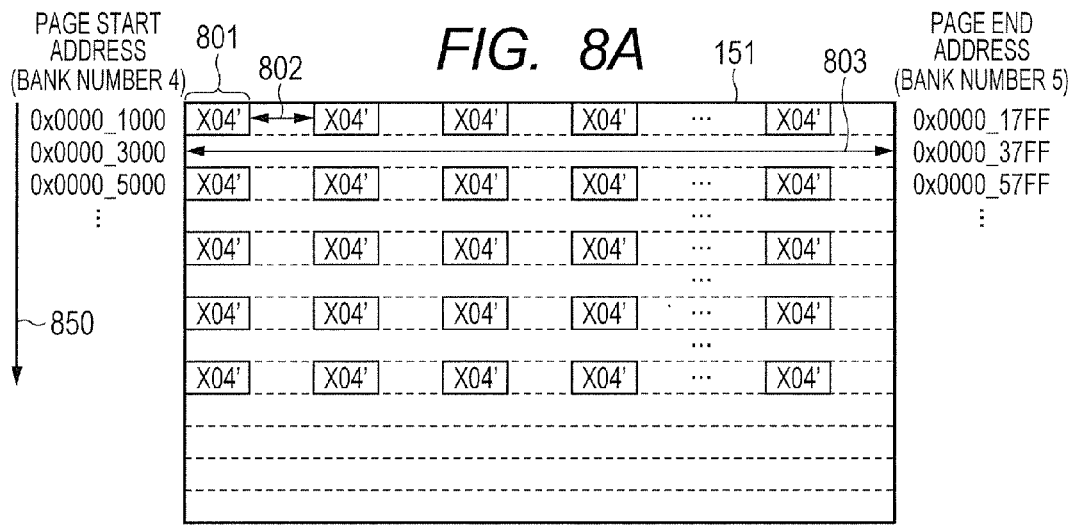
FIG. 8A, FIG. 8B and FIG. 8C are views for describing a method of controlling the writing and reading of the hierarchical image data in and from the DRAM, which has been subjected to the noise reduction processing, in the noise reduction processing of the image processing apparatus according to the first exemplary embodiment of the present invention.
Figure 8B:
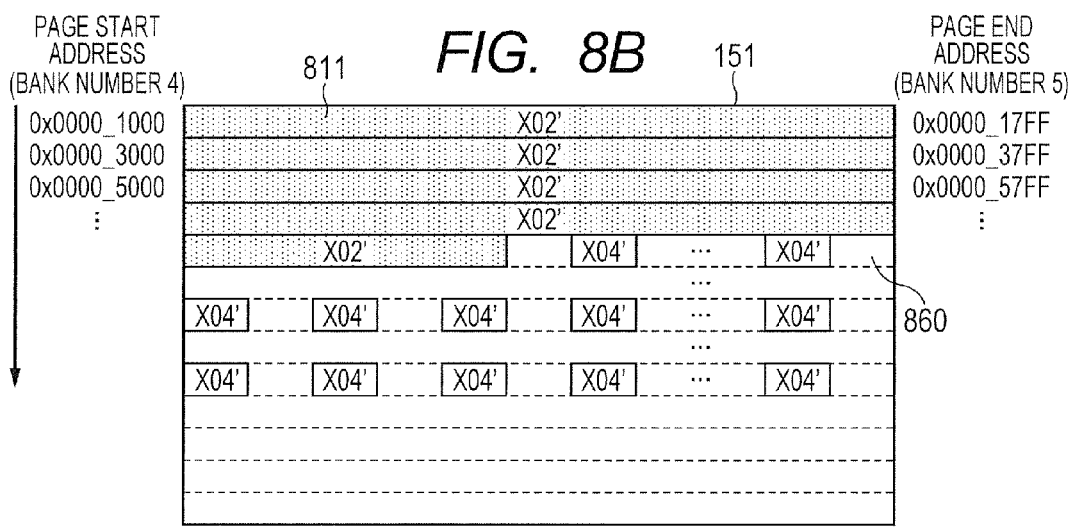
Figure 8C:
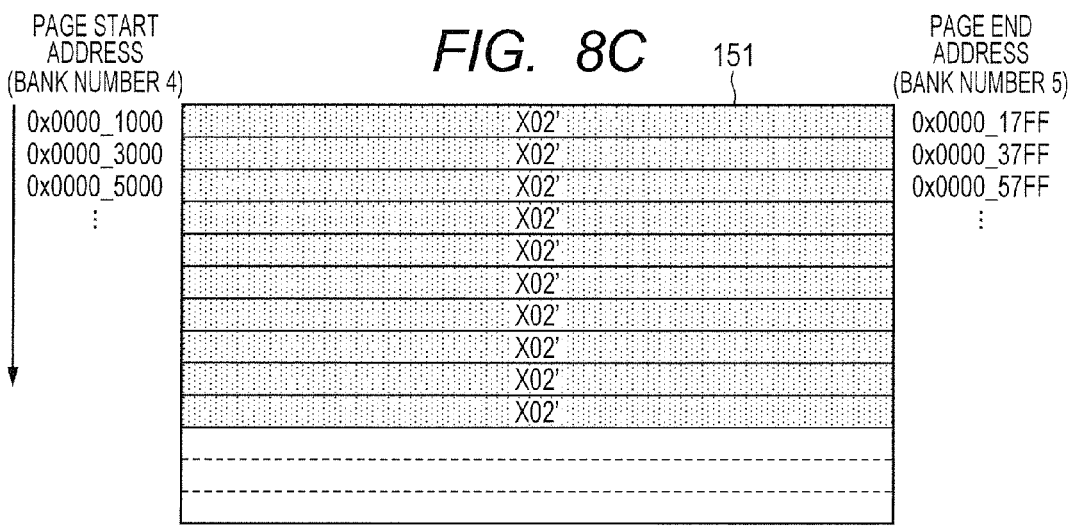

Here, FIG. 8A to FIG. 8C are views illustrating the method of controlling the write and the readout of the second NR and third NR image data from and to the banks with the numbers of 4 to 5 in the DRAM 107. A region between the left end and the right end in each of FIG. 8A to FIG. 8C corresponds to the same page in the banks with the numbers of 4 to 5. In FIG. 8A to FIG. 8C, a storage region X02' for the second NR image data is illustrated, and a storage region X04' for the third NR image data is illustrated. FIG. 8A is a view illustrating data which has been stored in the DRAM 107, at the time when the writing of the third NR image data has been completed (time t=T1 in FIG. 5). FIG. 8B is a view illustrating each of image data which have been stored in the DRAM 107 in a readout period of the third NR image data and a write period of the second NR image data (period Ts0 in FIG. 5). FIG. 8C is a view illustrating data which has been stored in the DRAM 107, at the time when the writing of the second NR image data has been completed (time t=T2 in FIG. 5).

In the period Tm1 of FIG. 5, the third NR image data which has been output from the expansion processing unit 123 is output to the banks with the numbers of 4 and 5 in the DRAM 107. The expansion processing unit 123 performs write processing from the starting end address 0x0000_1000 in the bank with the number of 4, while an address value is incremented by the unit of a length of data to be transferred. An arrow 850 of FIG. 8A illustrates a direction in which the row address is incremented. In the present embodiment, a capacity from the top address to the end address in the same page in the banks with the numbers of 4 to 5 in the DRAM 107 illustrated in FIG. 3 shall be the same as the storage capacity for data corresponding to two lines of the second NR image data.

As has been described above, in odd-numbered frames, the first to third image data are read from the position of a finishing end pixel toward a reverse direction by the expansion processing unit 123, and accordingly the first NR to the third NR image data are also written from the end position of the screen (lower right of screen).

The image data 801 of FIG. 8A illustrates the third NR image data which corresponds to 8 pixels that are written in the DRAM 107 by one time of transfer, (hereafter referred to as pixel block). Each pixel block 801 is written at a space 802 which corresponds to 8 pixels. In addition, after the third NR image data corresponding to 1,024 pixels has been written, the 8-pixel block of the third NR image data is written at a space 803 corresponding to 1,024 pixels. After this, these arrangements are repeated. As has been described above, a capacity from the top address to the end address in the same page in the banks with the numbers of 4 to 5 in the DRAM 107 illustrated in FIG. 3 is the same as the storage capacity for data corresponding to two lines of the second NR image data. Because of this, the DRAM 107 can store image data corresponding to four lines of the third image data, in the storage capacity from the top address to the end address of the same page in the banks with the numbers of 4 to 5. However, in the present embodiment, the third NR image data corresponding to 8 pixels is written in the same page of the banks with the numbers of 4 to 5, at a space corresponding to 8 pixels. Accordingly, the third NR image data corresponding to two lines is written in the same page. In addition, after the third NR image data of 1,024 pixels has been written, the third NR image data corresponding to two lines is written in the DRAM 107 at a space of one page, because a space 803 corresponding to 1,024 pixels are emptied in the memory region.

Here, FIG. 9 is a timing chart illustrating the third NR image data which is input in the expansion processing unit 123 in the period Ts0 of FIG. 5, and the second NR image data which is output from the expansion processing unit 123. The image size of the second NR image data becomes as twice as the image size of the third NR image data, both in horizontal and vertical directions. Then, in the present embodiment, as is illustrated in FIG. 9, in a period of the odd-numbered line of the second NR image data, the third NR image data corresponding to two lines are read out from the DRAM 107 to the expansion processing unit 123, and the second NR image data corresponding to two lines are generated. Then, one line out of generated two lines of the second NR image data is written in the region in which the third NR image data has been stored, and the next line is written in the page in which the third NR image data is not stored. In addition, in a period of the even-numbered line of the second NR image data, the third NR image data is not read out to the expansion processing unit 123. Thus, the processing of outputting 16 pixels of the second NR image data is repeated with respect to the region in which 8 pixels of the third NR image data are stored. On the other hand, the vertical pixel size of the second NR image data is as twice as that of the third NR image data, and accordingly the third NR image data is not input into the expansion processing unit 123 in a period during which the even-numbered line of the second NR image data is output. After this, processes for the odd-numbered line and the even-numbered line are alternately repeated.

Thus, the third NR image data is stored in the DRAM 107 as in FIG. 8A, and thereby after the pixel block 801 has been read out to the expansion processing unit 123, the second NR image data can be overwritten there which has been processed by using this pixel block 801. Specifically, the second NR image data can be written in the same row address as the row address in which the third NR image data is read out, until the readout of the last pixel block 801 in the same page is completed. Thereby, the period can be set longer which is spent before the address reaches the same page 860 of the same bank. Because of this, similarly to the processing of the hierarchical processing image data, the frequency of write and readout accesses to the same page of the same bank in the DRAM 107 increases, and the frequency of occurrence of the pre-charge decreases, which enable the data to be efficiently transferred.

In addition, the read-out third NR image data is subjected to expansion processing, and the result is output as data of the second image data. Because of this, it does not occur that the write address of the second NR image data overtakes the read address of the third NR image data. Accordingly, an adjustment by an address controlling unit 210 becomes unnecessary. Furthermore, a storage region of the third NR image data is made to overlap with a storage region of the second NR image data, and thereby a region to be used for the noise reduction processing can be saved.

As is illustrated in FIG. 8C, after the writing of the second NR image data has been completed, the second NR image data is output to the expansion processing unit 123, and the first NR image data is output by the expansion processing unit 123. Also when the first NR image data is generated, the second NR image data and the first image data are read out from the position of the finishing end pixel of a screen, and are processed. Because of this, when the first NR image data is written in the banks with the numbers of 6 and 7 in the DRAM 107, the image data is written while the address value is decremented from the start address 0x017F_FFEF. Then, when the first NR image data is read out, the image data is read out while the address is incremented, and thereby the image data is output to a display control unit 110 in an order of a raster scan. Similar processing is performed also in subsequent periods Tm2 (Ts1), Tm3 (Ts2) and so on.

As in the above description, in the present exemplary embodiment, an example has been described in which the image processing apparatus of the present invention is applied to an imaging apparatus, but the application is not limited to the imaging apparatus. For instance, it goes without saying that the image processing apparatus of the present invention can be applied also as noise reduction processing based on multi-rate signal processing in an information-processing apparatus such as PC, a printer, a smart phone and the like.

First Modified Example

Here, an image processing apparatus according to the first modified example of the first exemplary embodiment of the present invention will be described with reference to FIG. 10A to FIG. 10D.

In the first exemplary embodiment, processing has been performed while the image data to be input in the expansion processing unit 123 is read out from the pixel in the position of the finishing end of one screen in a reverse direction, but a similar effect is obtained also when the direction of processing of the image data is reversed which is output from the reduction processing unit 122. The present modified example is different from the first exemplary embodiment only in write and readout processes of the image data in FIG. 7A to FIG. 7D for the DRAM 107, and the other configurations are the same as those in the first exemplary embodiment. Accordingly, the description will be omitted here unless otherwise specifically needed.

FIG. 10A to FIG. 10D are views illustrating a method of controlling writing and reading of the image data in and from the DRAM 107 in the case where the image data of a plurality of frames, which have been input in the image processing unit 104, are continuously subjected to the noise reduction processing. FIG. 10A is a view illustrating a reading order of the image data of odd-numbered frames, which are output to the expansion processing unit 123. FIG. 10B is a view illustrating a reading order of the image data of even-numbered frames, which are output to the expansion processing unit 123. FIG. 10C is a view illustrating a writing order of the image data of odd-numbered frames, which have been output from the reduction processing unit 122. FIG. 10D is a view illustrating a writing order of the image data of even-numbered frames, which have been output from the reduction processing unit 122.

According to the timing chart in FIG. 5, a method of controlling the access to a memory region of the banks with the numbers of 0 to 3 in the DRAM 107 will be described below in the case where the image processing unit 104 continuously subjects image data of a plurality of frames, which have been input therein, to the noise reduction processing. Incidentally, as is illustrated in FIG. 3, the first to third image data which are to be subjected to the noise reduction processing are stored in the memory region of the banks with the numbers of 0 to 3 in the DRAM 107.

In the period Tm0 of FIG. 5, image data which is an object of the noise reduction processing is read out from the position of the finishing end pixel of one screen, from the DRAM 107 in a reverse direction, and is output to the reduction processing unit 122. As for the processed output data, as is illustrated in FIG. 10C, the first image data of the first frame is written in the DRAM 107, which has been output from the reduction processing unit 122, while an address 0x00FB_EFFF is determined to be the start address and the address value is decremented. A subsequent second image data of the first frame is written in the DRAM 107, while an address 0x003B_EFFF is determined to be the start address and the address value is decremented. A subsequent third image data of the first frame is written in the DRAM 107, while an address 0x000B_EFFF is determined to be the start address and the address value is decremented. An arrow 905 of FIG. 10C illustrates a direction in which the row address is decremented, and an arrow 906 illustrates a direction in which the column address is decremented.

In the period Tm1 of FIG. 5, the expansion processing unit 123 reads out image data while an address 0x0000_0000 at the position of the starting end pixel of hierarchical image data X04 of the first frame is determined to be the start address, and the address value is incremented, as is illustrated in FIG. 10A. At the same time, as is illustrated in FIG. 10D, the first image data of the second frame is written in the DRAM 107, which has been output from the reduction processing unit 122, while an address 0x0000_0000 is determined to be the start address and the address value is incremented. An arrow 901 of FIG. 10A illustrates a direction in which the row address is incremented, and an arrow 902 illustrates a direction in which the column address is incremented. An arrow 907 of FIG. 10D illustrates a direction in which the row address is incremented, and an arrow 908 illustrates a direction in which the column address is incremented.

Incidentally, as described above, an address controlling unit 210 that is provided in the data transfer unit 105 adjusts the write address and read address in the DRAM 107, which are generated by the WRDMAC1 203 and the RDDMAC1 204. Thereby, the write address of the WRDMAC1 203 does not overtake the read address of the RDDMAC1 204, and takes a form of chasing the read-out data while keeping a space between the addresses within a set predetermined value. Thereby, the frequency of write and readout accesses to the same page of the same bank in the DRAM 107 increases, and the frequency of the occurrence of the pre-charge decreases, which enable the data to be efficiently transferred.

Subsequently, as is illustrated in FIG. 10A, the second image data of the first frame is read out from the position of the starting end pixel (0x000C_0000), after the readout of the third image data of the first frame to the expansion processing unit 123 has been completed. After the readout of the second image data of the first frame has been completed, the first image data of the first frame is read out from the position of the starting end pixel (0x003C_0000). Similarly to the third image data of the first frame, the second image data 2 and the first image data are also read out while the address value is incremented.

At the same time, as is illustrated in FIG. 10D, the second image data of the second frame is written in the DRAM 107, after the writing of the first image data of the second frame has been completed, which has been output from the reduction processing unit 122. At this time, the second image data of the second frame is written while an address (0x0000_0000) is determined to be the start address. After the writing of the second image data of the second frame has been completed, the third image data of the second frame is written in the DRAM 107, while an address (0x00F0_0000) is determined to be the start address. Similarly to the writing of the third image data of the first frame, the second and third image data are also written while the address value is incremented.

Thus, in the period Tm1, the image data X01, X02 and X04 which have been output from the reduction processing unit 122 are written in the storage region in a form of chasing the read-out data, in which the image data read out to the expansion processing unit 123 has been stored.

An arrangement of the first, second and third image data in the DRAM 107, which are illustrated in FIG. 10D, becomes such an arrangement that the arrangement of each piece of image data in FIG. 10A is reversed in an H direction and a V direction.

In the period Tm2 of FIG. 5, the third image data of the second frame is read out to the expansion processing unit 123, while an address 0x00FB_EFFF including the position of the starting end pixel is determined to be the start address, and the address value is decremented, as is illustrated in FIG. 10B. At the same time, as is illustrated in FIG. 10C, the first image data of the third frame is written there, which has been output from the reduction processing unit 122, while an address 0x00FB_EFFF is determined to be the start address and the address value is decremented. An arrow 903 of FIG. 10B illustrates a direction in which the row address is decremented, and an arrow 904 illustrates a direction in which the column address is decremented.

Incidentally, similarly to the processing in the period Tm1, the address controlling unit 210 controls the address to be written through the WRDMAC1 203 so as not to overtake the address to be read out through the RDDMAC1 204, and so as to chase the address to be read out while keeping a space between the addresses within a set predetermined value. Thereby, the frequency of write and readout accesses to the same page of the same bank in the DRAM 107 increases, and the frequency of occurrence of the pre-charge decreases, which enable the data to be efficiently transferred.

Subsequently, as is illustrated in FIG. 10B, the second image data of the first frame is read out from the address 0x00EF_FFFF at the position of the finishing end pixel, after the readout of the third image data of the first frame to the expansion processing unit 123 has been completed. After the readout of the second image data of the first frame has been completed, the first image data of the first frame is read out from an address 0x00BF_EFFF at the position of the finishing end pixel. Similarly to the readout of the third image data of the first frame, the second image data and the first image data are also read out while the address value is decremented.

At the same time, as is illustrated in FIG. 10C, the second image data of the second frame is written in the DRAM 107, after the writing of the first image data of the second frame has been completed, which has been output from the reduction processing unit 122. At this time, the second image data of the second frame is written while an address 0x003B_EFFF is determined to be the start address. After the writing of the second image data of the second frame has been completed, the third image data of the second frame is written while an address 0x000B_EFFF is determined to be the start address. Similarly to the first image data of the first frame, the second and the third image data are also written while the address value is decremented.

Thus, also in the period Tm2, the image data which has been output from the reduction processing unit 122 is written in the storage region in a form of chasing the output data, in which the image data output to the expansion processing unit 123 has been stored.

After this, in the period Tm3, similar processing to that in the period Tm1 is performed, and the similar processes to those in the period Tm1 and the period Tm2 are repeated alternately.

In the present modified example, the processing of the image data which has been subjected to the noise reduction processing is started also from the position of the starting end pixel, and accordingly when being written in the banks with the numbers of 6 and 7 in the DRAM 107, the image data is written there while the address value is incremented from the start address 0x0000_1800. Thereby, the image data are arranged in a memory region as an alignment of the usual pixel.

Second Modified Example

Next, an image processing apparatus according to a second modified example of the first exemplary embodiment of the present invention will be described with reference to FIG. 11A to FIG. 11D.

In the first exemplary embodiment and the first modified example thereof, when the image data is output from the DRAM 107 to the expansion processing unit 123, the image data has been read out in a reverse direction from the pixel in the finishing end position of the image. In the second modified example, a method of controlling reading and writing is changed so as to start the processing from the top pixel (corresponding to H=0 of FIG. 6A to FIG. 6C) of each line of the hierarchical image data, but the same effect is obtained. Similarly to the first modified example, also the present modified example is different from the first exemplary embodiment only in write and readout processes of the image data in FIG. 7A to FIG. 7D for the DRAM 107, and the other configurations are the same as those in the first exemplary embodiment. Accordingly, the description will be omitted here unless otherwise specifically needed.

FIG. 11A to FIG. 11D are views illustrating a method of controlling writing and reading of the image data in and from the DRAM 107 in the case where the image data of a plurality of frames, which have been input in the image processing unit 104, are continuously subjected to the noise reduction processing. FIG. 11A is a view illustrating a reading order of the image data of odd-numbered frames, which are output to the expansion processing unit 123. FIG. 11B is a view illustrating a reading order of the image data of even-numbered frames, which are output to the expansion processing unit 123. FIG. 11C is a view illustrating a writing order of the image data of odd-numbered frames, which have been output from the reduction processing unit 122. FIG. 11D is a view illustrating a writing order of the image data of even-numbered frames, which have been output from the reduction processing unit 122.

According to the timing chart for processing in FIG. 5, a method of controlling the access to the memory region of the banks with the numbers of 0 to 3 in the DRAM 107 will be described below in the case where the image processing unit 104 continuously subjects the image data of a plurality of frames, which have been input therein, to the noise reduction processing. Incidentally, as is illustrated in FIG. 3, each piece of image data is stored in the storage regions in the banks with the numbers of 0 to 3 in the DRAM 107.

In the period Tm0 of FIG. 5, as is illustrated in FIG. 11C, the first, the second and the third image data of the first frame are stored, which have been output from the reduction processing unit 122. The contents of the processing are the same as those in the period Tm0 in the first exemplary embodiment. An arrow 1105 of FIG. 11C illustrates a direction in which the row address is incremented, and an arrow 1106 illustrates a direction in which the column address is incremented.

In the period Tm1 of FIG. 5, as is illustrated in FIG. 11A, the readout of a line (X04:L380) of the 381st row in the third image data of the first frame to the expansion processing unit 123 is started. Specifically, the line is read out while an address 0x00FB_E000 of the top pixel is determined to be the start address value and the address is incremented. Subsequently, a line (X04:L381) of the 382nd row, a line (X04:L382) of the 383rd row and a line (X04:L383) of the 384th row are read out from the top pixel. At the same time, as is illustrated in FIG. 11D, the line (X01:L0) of the first row in the first image data of the second frame, which has been output from the reduction processing unit 122, is written in the storage region of the third image data that corresponds to the read-out four lines. Specifically, the writing of the line of the first row in the first image data of the second frame is executed, while an address 0x00FB_E000 of the top pixel is determined to be the start address value and the address is incremented.

Similarly to the first exemplary embodiment and the first modified example thereof, addresses that are used for reading and writing in the address controlling unit 210 approach each other, which is included in the data transfer unit 105, and accordingly the frequency of write and readout accesses to the same page of the same bank in the DRAM 107 increases. Thereby, the frequency of occurrence of the pre-charge decreases, which enables the data to be efficiently transferred.

Incidentally, the expansion processing unit 123 temporarily stores input four lines in a line buffer, and executes the processing sequentially from a line (X04:L383) of the lower end.

Subsequently, as is illustrated in FIG. 11A, the expansion processing unit 123 reads out a line (X04:L376) of the 377th row so as to input the line therein, after having completed the readout of the line (X04:L383) of the 384th row in the third image data of the first frame. Specifically, the line is read out while the address value is jumped by a DMAC, an address 0x00FB_C000 at the position of the top pixel is determined to be the start address value, and the address is incremented. Subsequently, a line (X04:L377) of the 378th row, a line (X04:L378) of the 379th row and a line (X04:L379) of the 380th row are read out. After this, units of four lines are sequentially read out, and after the readout has been completed, such processing is sequentially repeated that the address value jumps and four lines in the upper side of the image data are read out.

After the readout of the third image data of the first frame has been completed, the readout is started from a line (X02:L766) of the 767th row in the second image data. Specifically, the line is read out while an address 0x00EF_E000 at the position of the top pixel is determined to be the start address value and the address is incremented. Subsequently, a line (X02:L767) of the 768th row in the second image data is read out from the position of the top pixel. Next, a line (X02:L764) of the 765th row is read out from the position of the top pixel. Specifically, the line is read out while the address value is jumped by a DMAC, an address 0x00FF_C000 at the position of the top pixel is determined to be the start address value, and the address is incremented. Subsequently, a line (X02:L765) of the 766th row in the second image data is read out from the position of the top pixel. After this, units of two lines are sequentially read out, and after the readout has been completed, such processing is sequentially repeated that the address value jumps and two lines in the upper side of the image data are read out.

After the readout of the second image data of the first frame has been completed, the readout is started from a line (X01:L1535) of the 1536th row in the first image data. Specifically, the line is read out while an address 0x00BF_E000 at the position of the top pixel is determined to be the start address value and the address is incremented. Next, a line (X01:L1534) of the 1535th row is read out from the position of the top pixel. Specifically, the line is read out while the address value is jumped by a DMAC, an address 0x00BF_C000 at the position of the top pixel is determined to be the start address value, and the address is incremented. After this, units of one line are sequentially read out, and after the readout has been completed, such processing is sequentially repeated that the address value jumps and one line in the upper side of the image data is read out.

At the same time, as is illustrated in FIG. 11D, the line (X01:L0) of the second row is written from the position of the top pixel, after the writing of the line (X01:L0) of the first row in the first image data of the second frame has been completed, which has been output from the reduction processing unit 122. Specifically, the line is written while the address value is jumped by a DMAC, the address 0x00FB_C000 is determined to be the start address value, and the address is incremented. After this, units of one line are sequentially written, and after the writing has been completed, such processing is sequentially repeated that the address value jumps and next one line of the image data is written.

After the writing of the first image data of the second frame has been completed, the writing is started from the line (X02:L0) of the first row in the second image data. Specifically, the line is written while an address 0x003B_E000 at the position of the top pixel is determined to be the start address value and the address is incremented. Next, subsequently, the line (X02:L1) of the second row in the second image data is written from the position of the top pixel. Next, the line (X02:L2) of the third row is written from the position of the top pixel. Specifically, the line is written from the position of the top pixel while the address value is jumped by a DMAC, an address 0x003B_C000 is determined to be the start address value, and the address is incremented. Subsequently, a line (X02:L3) of the fourth row in the second image data is written from the position of the top pixel. After this, units of two lines are sequentially written, and after the writing has been completed, such processing is sequentially repeated that the address value jumps and next two lines of the image data are written. Incidentally, the expansion processing unit 123 temporarily stores input two lines in a line buffer, and executes the processing sequentially from the line (X02:L767) of the lower end.

After the writing of the second image data of the second frame has been completed, the writing is started from the line (X04:L0) of the first row in the third image data of the second frame. Specifically, the line is written from the position of the top pixel while the address value is jumped by a DMAC, an address 0x00B_E000 is determined to be the start address value, and the address is incremented. Subsequently, the line (X04:L1) of the second row, a line (X04:L2) of the third row and a line (X04:L3) of the fourth row are written from the position of the top pixel. Next, a line (X04:L4) of the fifth row is written from the position of the top pixel while the address value is jumped by a DMAC, an address 0x00B_C000 is determined to be the start address value, and the address is incremented. Subsequently, a line (X04:L5) of the sixth row, a line (X04:L6) of the seventh row and a line (X04:L7) of the eighth row are written from the position of the top pixel. After this, units of four lines are sequentially written, and after the writing has been completed, such processing is sequentially repeated that the address value jumps and next four lines of the image data are written.

An arrow 1101 of FIG. 11A illustrates a direction in which the row address is incremented, and an arrow 1102 illustrates a direction in which the column address is incremented. An arrow 1107 of FIG. 11D illustrates a direction in which the row address is incremented, and an arrow 1108 illustrates a direction in which the column address is incremented.

Thus, in the period Tm1, the image data which has been output from the reduction processing unit 122 is written in the storage region in a form of chasing the output data, from which the image data has been output to the expansion processing unit 123. However, in the second modified example, the address value is jumped at the timing at which the readout of 2048 pixels corresponding to one line of the first image data has been completed, in order that the 2048 pixels are input in the expansion processing unit 123. Similarly, the address value is jumped at the timing at which the writing of 2048 pixels output from the reduction processing unit 122 has been completed. Due to this jump control, the address value can be controlled by the DMAC only by the control for the increment.

In the period Tm2 of FIG. 5, as is illustrated in FIG. 11B, the image data is read out to the expansion processing unit 123. At this time, the line (X04:L380) of the 381st row in the third image data of the second frame is read out while the address 0x0000_0000 at the position of the top pixel thereof is determined to be the start address and the address value is incremented. Subsequently, the line (X04:L381) of the 382nd row, the line (X04:L382) of the 383rd row and the line (X04:L383) of the 384th row are read out. At the same time, as is illustrated in FIG. 11C, the line (X01:L0) of the first row in the first image data X01 of the third frame is written in the memory region in which the readout has been completed, while the address 0x0000_0000 is determined to be the start address and the address value is incremented.

After this, as is illustrated in FIG. 11B, the line (X04:L376) of the 377th row, the line (X04:L377) of the 378th row, the line (X04:L378) of the 379th row and a line (X04:L379) of the 380th row each in the third image data are read out. After the readout of the third image data has been completed, the line (X02:L766) of the 767th row and the line (X02:L767) of the 768th row each in the second image data are read out. Next, the line (X02:L764) of the 765th row and the line (X02:L765) of the 766th row are read out. After the readout of the second image data has been completed, the line (X01:L1535) of the 1536th row and the line (X01:L1534) of the 1535th row each in the first image data are read out. The lines are sequentially read out up to the line (X01:L0) of the first row in the first image data. An arrow 1103 of FIG. 11B illustrates a direction in which the row address is incremented, and an arrow 1104 illustrates a direction in which the column address is incremented. In addition, writing processing of the reduction processing unit 122 is simultaneously performed as is illustrated in FIG. 11C.

Accordingly, similarly to the processing in the period Tm1, the address controlling unit 210 controls the address to be written through the WRDMAC1 203 so as not to overtake the address to be read out through the RDDMAC1 204, and so as to chase the address to be read out while keeping a space between the addresses within a set predetermined value. Thereby, the frequency of write and readout accesses to the same page of the same bank in the DRAM 107 increases, and the frequency of occurrence of the pre-charge decreases, which enable the data to be efficiently transferred. Thus, also in the period Tm2, the image data which has been output from the reduction processing unit 122 is written in the storage region in a form of chasing the output data, in which the readout of the image data to the expansion processing unit 123 has been completed.

After this, in the period Tm3, similar processing to that in the period Tm1 is performed, and the similar processes to those in the period Tm1 and the period Tm2 are repeated alternately.

The output of the image data which is a final processed image and has been subjected to the noise reduction processing is also started from the position of the top pixel of the last line, and accordingly, when the image data is written in the banks with the numbers of 6 and 7 in the DRAM 107, the image data is written while the address value is incremented from the start address of 0x017F_F800. After one line of the image data has been written, the address value is jumped by a DMAC and a line that is one line above 0x017F_D800 of the image data is written from the position of the top pixel. The similar processes are sequentially repeated, and thereby the alignment of the pixels is returned to normal alignment and the pixels are arranged in the memory region. Similar processing is performed also in subsequent periods Tm3 (Ts2) and so on.

Incidentally, in the present modified example, the third image data and the second image data have been processed while the address value jumps by the unit of 2048 pixels of one line of the first image data, but the image data may be processed while the address value jumps by the unit of one line of each piece of image data. However, the image data cannot be written until the readout of the image data from the address is completed in which pixels corresponding to one line of the image data of the next frame is written.

In addition, such a processing method can also be applied to the first modified example as to read out the image data while the address value jumps by the unit of 2048 pixels of one line of the first image data, and the address value is incremented from the top pixel of each line, as in the present modified example.

As described above, when a plurality of frames are continuously subjected to the noise reduction processing, an order of readout of the image data to the expansion processing unit 123 and an order of writing the image data in the reduction processing unit 122 are set at reverse directions to each other. Thereby, the frequency of occurrence of the pre-charge is reduced, and access efficiency to the DRAM 107 can be enhanced. In addition, the control for the address which the DMAC creates for reading and writing the image data can be achieved by simple units such as controls for the increment and decrement of the address value.

Furthermore, when the image data are processed which have been subjected to the noise reduction processing, image data having small sizes are arranged in the memory region which stores image data having a large size, so as to have a fixed space between the image data. The image data having a large size of a next frame is written in a storage region of the image data of which the readout has been completed. Thereby the frequency of occurrence of the pre-charge is reduced, and access efficiency to the DRAM 107 can be enhanced.

In the above, the present invention has been described in detail based on the exemplary embodiments, but the present invention is not limited to these particular embodiments, and various forms are also included in such a range as not to deviate from the scope of the invention. Parts of the above described embodiments may be appropriately combined.

For instance, the present invention can be applied also to the case where sizes of the images are different from each other, or the case where the image data is divided into a plurality of pieces of image data without being collectively processed and is processed one by one in every division unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-223254, filed Oct. 31, 2014, which is hereby incorporated by reference herein in its entirety.

What is claimed is:

1. An image processing apparatus comprising:
a first image processing unit configured to generate second image data having a pixel number smaller than a pixel number of first image data, wherein the first image processing unit generates a plurality of frames of the second image data corresponding to a plurality of frames of the first image data, and outputs the first and second image data in a first order such that, for each of the frames, the second image data is later than the first image data;
a second image processing unit configured to subject the first and second image data to a predetermined process in a second order such that, for each of the frames, the first image data is later than the second image data;
a memory having a plurality of storage regions; and
a memory control unit configured to control a transferring the image data between the first and second image processing units and the memory, wherein
the memory control unit writes, in the first order, in a first storage region of the memory, the first and second image data of a first frame from the first image processing unit, and writes, in the first order, in the first storage region of the memory, the first and second image data of a second frame next to the first frame from the first image processing unit,
the memory control unit reads, in the second order, the first and second image data of the first frame from the first storage region, to output them to the second image processing unit, and reads, in the second order, the first and second image data of the second frame from the first storage region, to output them to the second image processing unit, and,
after reading out the second image data of the first frame from the memory, the memory control unit writes the first image data of the second frame into an address at which the second image data of the first frame is stored.

2. The image processing apparatus according to claim 1, wherein
the memory control unit changes a write address by an increment from a first address in the first storage region, to write, in the first storage region, image data from a top pixel of the first image data of the first frame to an end pixel of the second image data of the first frame in the first order,
the memory control unit changes a read address by a decrement from a second address at which the end pixel of the second image data of the first frame is stored, to read, from the first storage region, image data from an end pixel of the second image data of the first frame to a top pixel of the first image data of the first frame in the second order, and
after reading out the end pixel of the second image data of the first frame from the memory, the memory control unit changes the write address by the decrement from the second address, to write, in the first storage region, image data from a top pixel of the first image data of the second frame to an end pixel of the second image data of the second frame in the first order.

3. The image processing apparatus according to claim 2, wherein
the memory has a plurality of memory banks,
the first storage region includes a predetermined number of the memory banks, and the memory control unit reads the second image data of the first frame from a predetermined row address, while writes the first image data of the second frame in the predetermined row address.

4. The image processing apparatus according to claim 3, wherein
the memory control unit controls a transferring of the image data, such that the write address of the image data of the second frame does not overtake the read address of the image data of the first frame.

5. The image processing apparatus according to claim 1, wherein
the memory control unit stores, in a second storage region of the memory, the first and second image data of a plurality of frames processed by the second processing unit in the second order.

6. The image processing apparatus according to claim 5, wherein
the second image processing unit performs an expansion processing to expand a number of the pixels of the second image data subjected to the predetermined processing into a same number of the pixels of the first image data, and performs a processing to synthesize the second image data expanded and the first image data subjected to the predetermined processing.

7. The image processing apparatus according to claim 6, wherein,
after reading the second image data subjected to the predetermined processing from the second region and outputting the second image data to the second image processing unit, the memory control unit write the first image data subjected to the synthesizing processing in an address at which the second image data subjected to the predetermined processing is stored.

8. The image processing apparatus according to claim 7, wherein
the memory has a plurality of memory banks,
the second storage region includes a predetermined number of the memory banks, and
the memory control unit writes the second image data of n-pixels at an interval of m-pixels in a page designated by one row address, and writes the first image data subjected to the synthesizing processing continuously in a page in which the second image data outputted from the second image processing unit is stored.

9. The image processing apparatus according to claim 1, wherein
the memory is a DRAM, and
the second image processing unit performs a noise reduction processing of the image data.

10. An image processing apparatus comprising:
a first image processing unit configured to generate second image data having a pixel number smaller than a pixel number of first image data and a third image data having a pixel number smaller than the pixel number of the second image data, wherein the first processing unit generates a plurality of frames of the second image data corresponding to a plurality of frames of the first image data and a plurality of frames of the third image data corresponding to a plurality of frames of the first image data and outputs the first, second and third image data in a first order such that, for each of the frames, the second image data is later than the first image data and the third image data is later than the second image data;
a second image processing unit configured to subject the first, second and third image data to a predetermined process in a second order such that, for each of the frames, the first image data is later than the second image data and the second image data is later than the third image data;
a memory having a plurality of storage regions; and
a memory control unit configured to control a transferring the image data between the first and second image processing units and the memory, wherein
the memory control unit writes the first, second and third image data of a plurality of frames from the first image processing unit in the first order in a first storage region of the memory, and reads the first, second and third image data of a plurality of frames in the second order from the first storage region of the memory to output them to the second image processing unit,
after reading out the third image data of an odd frame among the plurality of frames from the first storage region, the memory control unit writes the first image data of an even frame next to the odd frame in an address in which the third image data of the odd frame is stored, and,
after reading out the third image data of an even frame among the plurality of frames from the first storage region, the memory control unit writes the first image data of an odd frame next to the even frame in an address in which the third image data of the even frame is stored.

11. A controlling method of an image processing apparatus comprising:
a first image processing unit configured to generate, corresponding to a first image data of a plurality of frames, a second image data of a plurality of frame and of a pixel number smaller than a pixel number of the first image data, and to output the first and second image data in a first order such that, for each of the frames, the second image data is later than the first image data;
a second image processing unit configured to subject the first and second image data to a predetermined process in a second order such that, for each of the frames, the first image data is later than the second image data; and
a memory having a plurality of storage regions, wherein the controlling method comprises:
controlling a transferring the image data between the first and second image processing units and the memory, wherein
writing, in the first order, in a first storage region of the memory, the first and second image data of a first frame from the first image processing unit, and writes, in the first order, in the first storage region of the memory, the first and second image data of a second frame next to the first frame from the first image processing unit,
reading, in the second order, the first and second image data of the first frame from the first storage region, to output them to the second image processing unit, and reads, in the second order, the first and second image data of the second frame from the first storage region, to output them to the second image processing unit, and,
after reading out the second image data of the first frame from the memory, writing the first image data of the second frame into an address at which the second image data of the first frame is stored.

* * * * *